(12) United States Patent
Mehta et al.

(10) Patent No.: US 7,280,942 B2
(45) Date of Patent: Oct. 9, 2007

(54) METHOD FOR REPRESENTING A COMBINATION OF SIGNALS WITH A DISTRIBUTION OF A SINGLE LOGNORMAL RANDOM VARIABLE

(75) Inventors: Neelesh B. Mehta, Medford, MA (US); Andreas F. Molisch, Arlington, MA (US); Jingxian Wu, Rohnert Park, CA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 11/203,440

(22) Filed: Aug. 15, 2005

(65) Prior Publication Data

US 2007/0038413 A1    Feb. 15, 2007

(51) Int. Cl.
 *G06F 15/00* (2006.01)
(52) U.S. Cl. .................................... 702/189
(58) Field of Classification Search ........... 702/69, 702/179, 180, 189–191; 703/4, 13
See application file for complete search history.

(56) References Cited

U.S. PATENT DOCUMENTS 7,013,255 B1 * 3/2006 Smith, II ................. 703/21
2004/0236560 A1 * 11/2004 Chen ....................... 703/18

OTHER PUBLICATIONS

H. Liu, "Error performance of a pulse amplitude and position modulated ultra-wideband system over lognormal fading channels," *IEEE Commun. Lett.*, vol. 7, pp. 531-533, 2003.

N. C. Beaulieu and Q. Xie, "An optimal lognormal approximation to lognormal sum distributions," *IEEE Trans. Veh. Technol.*, vol. 53, pp. 479-489, 2004.

S. B. Slimane, "Bounds on the distribution of a sum of independent lognormal random variables," *IEEE Trans. Commun.*, vol. 49, pp. 975-978, 2001.

F. Berggren and S. Slimane, "A simple bound on the outage probability with lognormally distributed interferers," *IEEE Commun. Lett.*, vol. 8, pp. 271-273, 2004.

H. R. Anderson, "Signal-to-interference ratio statistics for am broadcast groundwave and skywave signals in the presence of multiple skywave interferers," *IEEE Trans. Broadcasting*, vol. 34, pp. 323-330, 1988.

* cited by examiner

*Primary Examiner*—Michael Nghiem
(74) *Attorney, Agent, or Firm*—Dirk Brinkman; Clifton D. Mueller; Gene V. Vinokur

(57) ABSTRACT

A method analyzes a set of signal acquired from a physical system. A set of parameters characterizing the set of signals is measured. The parameters can include the mean and the variance of the power of the signal, and a Rician factor. A first point and a second point of a moment generating function for a combination of the set of signals are evaluated according to the set of parameters to obtain a first sample and a second sample, respectively. First and second equations are defined. The equations respectively have an approximation of a moment generation function of a lognormal random variable representing the combination of the set of signals, at the first point and the second point, on the left side, and the first and second sample on the right side. The two equations are solved to obtain a mean and a variance of the lognormal random variable representing a distribution of the combination of the set of the signals.

26 Claims, 18 Drawing Sheets

METHOD FOR REPRESENTING A COMBINATION OF SIGNALS WITH A DISTRIBUTION OF A SINGLE LOGNORMAL RANDOM VARIABLE

FIELD OF THE INVENTION

This invention relates generally to signal processing and analysis, and more particularly analyzing a combination of signals that can be represented by a single random variable.

BACKGROUND OF THE INVENTION

Sum of Lognormal Random Variables

A variable X is lognormally distributed when the natural logarithm Y=ln(X) is normally distributed. In many physical and financial analysis systems lognormal distributions are ubiquitous. Lognormal distributions can also be used for modeling mineral resources, pollutants, chemical sensitivities, etc., Crow et al. (Eds.), *Lognormal Distributions: Theory and Application*, Dekker, New York, 1988.

In another application, the attenuation due to shadowing in wireless channels is often modeled by a lognormal distribution. Hence, in the analysis of wireless systems, one often encounters the sum of lognormal random variables (RV). For example, the sum of lognormal RVs characterizes the total co-channel interference (CCI) at a receiver from all the transmissions in neighboring wireless cells. For brevity, the distribution of the sum of lognormal RVs can be referred to as the lognormal sum distribution.

The lognormal distribution is also of interest in outage probability analysis, G. L. Stüber, *Principles of Mobile Communications*, Kluwer Academic Publishers, 1996; and in ultra wide band systems, H. Liu, "Error performance of a pulse amplitude and position modulated ultra-wideband system over lognormal fading channels," *IEEE Commun. Lett.*, vol. 7, pp. 531-533, 2003.

Given the importance of the lognormal sum distribution in wireless communications, as well as in other fields such as optics and reliability theory, considerable efforts have been devoted to analyzing its statistical properties. While exact closed-form expressions for the lognormal sum probability distribution functions (PDFs) are unknown, several analytical approximation methods are known, L. F. Fenton, "The sum of lognormal probability distributions in scatter transmission systems," *IRE Trans. Commun. Syst.*, vol. CS-8, pp. 57-67, 1960; S. Schwartz and Y. Yeh, "On the distribution function and moments of power sums with lognormal components," *Bell Syst. Tech. J.*, vol. 61, pp. 1441-1462, 1982; N. C. Beaulieu and Q. Xie, "An optimal lognormal approximation to lognormal sum distributions," *IEEE Trans. Veh. Technol.*, vol. 53, pp. 479-489, 2004; S. B. Slimane, "Bounds on the distribution of a sum of independent lognormal random variables," *IEEE Trans. Commun.*, vol. 49, pp. 975-978, 2001; D. C. Schleher, "Generalized gram-charlier series with application to the sum of log-normal variates," *IEEE Trans. Inform. Theory*, pp. 275-280, 1977; and F. Berggren and S. Slimane, "A simple bound on the outage probability with lognormally distributed interferers," *IEEE Commun. Lett.*, vol. 8, pp. 271-273, 2004.

The prior art methods can be classified broadly into two categories, those that use a single distribution and those that use compound distributions. The methods by Fenton-Wilkinson (F-W), Schwartz-Yeh (S-Y), and Beaulieu-Xie (B-X) approximate the lognormal sum by a single lognormal RV. The proven permanence of the lognormal PDF when the number of summands becomes very large lends further credence to those methods, W. A. Janos, "Tail of the distributions of sums of lognormal variates," *IEEE Trans. Inform. Theory*, vol. IT-16, pp. 299-302, 1970; and R. Barakat, "Sums of independent lognormally distributed random variables," *J. Opt. Soc. Am.*, vol. 66, pp. 211-216, 1976.

The methods by Farley, Ben Slimane, and Schleher instead compute a compound distribution based on the properties of the lognormal RV. The compound distribution can be specified in several ways. For example, the methods in S. Schwartz and Y. Yeh, "On the distribution function and moments of power sums with lognormal components," *Bell Syst. Tech. J.*, vol. 61, pp. 1441-1462, 1982 and S. B. Slimane, "Bounds on the distribution of a sum of independent lognormal random variables," *IEEE Trans. Commun.*, vol. 49, pp. 975-978, 2001, specify the approximating distribution in terms of strict lower bounds of the cumulative distribution function (CDF), while D. C. Schleher, "Generalized gram-charlier series with application to the sum of log-normal variates," *IEEE Trans. Inform. Theory*, pp. 275-280, 1977, partitions the range of the lognormal sum into three segments, with each segment being approximated by a distinct lognormal RV.

Beaulieu et al. describe the accuracy of several of the above methods, and have shown that all the methods have their own advantages and disadvantages; none is unquestionably better than the others. The F-W method is inaccurate for estimating the CDF for small values of the argument, while the S-Y method is inaccurate for estimating the complementary CDF (CCDF) for large values of the argument. The Farley's method and, more generally, the formulae derived in S. B. Slimane, "Bounds on the distribution of a sum of independent lognormal random variables," *IEEE Trans. Commun.*, vol. 49, pp. 975-978, 2001, are strict bounds that can be loose approximations for certain typical parameters of interest. The methods also differ considerably in their complexity. For example, the S-Y method involves solving non-linear equations and requires an iterative procedure to handle the sum of more than two RVs. Only the F-W method offers a closed-form solution for calculating the underlying parameters of the approximating lognormal PDF.

Moment Generating Function Based Methods

The desirable property of a moment generating function (MGF) and the characteristic function (CF)—that the MGF (or CF) of a sum of independent RVs can be written as the product of the MGFs (or CFs) of the individual RVs, A. Papoulis, *Probability, Random Variables and Stochastic Processes*. McGraw Hill, 3rd ed., 1991—is well known. However, the methods that use this property to approximate the distribution of the sum of lognormal RVs by a lognormal distribution, generally require an extremely accurate numerical computation at a sufficiently large number of sample points. In addition, the methods are relatively complex, N. C. Beaulieu and Q. Xie, "An optimal lognormal approximation to lognormal sum distributions," *IEEE Trans. Veh. Technol.*, vol. 53, pp. 479-489, 2004; and R. Barakat, "Sums of independent lognormally distributed random variables," *J. Opt. Soc. Am.*, vol. 66, pp. 211-216, 1976. While the CF is a special case of the MGF, the two are treated separately for clarity of the following description. Moreover, the MGF-based methods have only considered the case where the lognormal RVs are independent of each other. The case for correlated RVs has not been explored.

Barakat first determined the CF of the lognormal distribution using a Taylor series expansion, and then applied an inverse Fourier transform to the product of the lognormal CFs to determine the PDF of the lognormal sum of RVS. However, the oscillatory property of the Fourier integrand as well as the slow decay rate of the lognormal PDF tail makes the numerical evaluation difficult and inaccurate. Also, no effort has been made to find the analytical expressions of the approximate distribution from the numerically computed PDF of the sum.

A similar method was described by H. R. Anderson, "Signal-to-interference ratio statistics for am broadcast groundwave and skywave signals in the presence of multiple skywave interferers," *IEEE Trans. Broadcasting*, vol. 34, pp. 323-330, 1988. The Beaulieu-Xie's method first numerically evaluated the lognormal sum CDF at several sample points with very high accuracy using a modified Clenshaw-Curtis method. The composite CDF is obtained by numerically calculating the inverse Fourier transform of the lognormal sum. The CDF is plotted on 'lognormal paper', in which the lognormal PDF appears as a straight line. The parameters of the approximating lognormal distribution are determined by minimizing the maximum (minimax) error in a given interval. While that method is optimal in the minimax sense on lognormal paper, this does not imply optimality in directly matching the probability distribution.

Sum of Correlated Lognormal Random Variables

The correlated case has been investigated in the literature. Extensions to the F-W method have been proposed in A. A. Abu-Dayya and N. C. Beaulieu, "Outage probabilities in the presence of correlated lognormal interferers," IEEE Trans. Veh. Technol., vol. 43, pp. 164-173, 1994; and F. Graziosi, L. Fuciarelli, and F. Santucci, "Second order statistics of the SIR for cellular mobile networks in the presence of correlated co-channel interferers," in Proc. VTC, pp. 2499-2503, 2001. Extension to the S-Y method to handle the correlated case was proposed in A. Safak, "Statistical analysis of the power sum of multiple correlated log-normal components," IEEE Trans. Veh. Technol., vol. 42, pp. 58-61, 1993; extensions to the Cumulants method have been considered in A. A. Abu-Dayya and N. C. Beaulieu, "Outage probabilities in the presence of correlated lognormal interferers," IEEE Trans. Veh. Technol., vol. 43, pp. 164-173, 1994. But Farley's method, the Beaulieu-Xie method, and the bounds of Ben-Slimane et al. do not apply to the sum of correlated lognormal RVs. Outage probability bounds, which, in effect, specify a compound distribution, are derived in F. Berggren and S. Slimane, "A simple bound on the outage probability with lognormally distributed interferers," IEEE Commun. Lett., vol. 8, pp. 271-273, 2004 using the arithmetic-geometric mean inequality and can handle the correlated case.

However, the basic limitations of the various methods still apply: the S-Y extension cannot accurately estimate small values of the CCDF, the F-W extension again cannot accurately estimate small values of the CDF, and the bounds are loose for larger logarithmic variances.

Sum of Suzuki or Lognormal-Rice Random Variables

An extension of the F-W-based moment matching method to approximate the distribution of a sum of Suzuki RVs by a lognormal distribution is described by F. Graziosi and F. Santucci, "On SIR fade statistics in Rayleigh-lognormal channels," *Proc. ICC*, pp. 1352-1357, 2002. Another technique is a two-step approximation process in which each of the lognormal-Rician or Suzuki RVs is first approximated by a lognormal RV, by equating the means and variances, and then the sum of the lognormal RVs is again approximated by a single lognormal RV using the F-W or the S-Y methods.

The sum of Suzuki RVs has also been approximated by another Suzuki RV, J. E. Tighe and T. T. Ha, "On the sum of multiplicative chi-square-lognormal random variables," *Proc. Globecom*, pp. 3719-3722, 2001. Exact formulae are known that express the outage probability of a sum of lognormal-Rician RVs in the form of a single integral, which is evaluated numerically, J.-P. M. Linnartz, "Exact analysis of the outage probability in multiple-user radio," *IEEE J. Select. Areas Commun.*, vol. 10, pp. 20-23, 1992; and M. D. Austin and G. L. Stuber, "Exact co-channel interference analysis for log-normal shadowed Rician fading channels," *Electron. Lett.*, vol. 30, pp. 748-749, 1994.

However, the problem of approximating any linear combination of lognormal random variables with a single lognormal RV was not addressed.

SUMMARY OF THE INVENTION

One embodiment of the invention provides a general method, which uses a moment generating function (MGF), which is a weighted integral of the probability distribution function, for approximating a distribution of a combination of independent lognormal random variables (RV) with a single lognormal RV. The distribution of the combination is characterized by a mean and variance. The method uses the Gauss-Hermite integral expansion to produce the approximate formula for the lognormal MGF.

By comparing the MGFs at a few points by means of an approximate formula for the lognormal MGF, the method circumvents the requirement for very precise numerical computations at a large number of sample points. The method is not recursive and numerically stable. The accuracy of the method can be one to two orders of magnitude greater than prior art methods in many applications.

The method also offers considerable flexibility compared to prior art methods in matching different regions of the probability distribution.

The method can be used for accurately approximating the sum of correlated lognormal RVs by a single lognormal RV. Such correlated lognormal RVs often arise in mobile telephone systems because the shadowing of inter-cell interferers is correlated with a typical site-to-site correlation coefficient of 0.5.

The method is sufficiently comprehensive to also approximate, by a lognormal RV, the sum of Suzuki RVs. The Suzuki RV is a product of a lognormal RV and a Rayleigh RV, H. Suzuki, "A statistical model for urban radio propagation," *IEEE Trans. Commun.*, vol. 25, pp. 673-677, 1977, and, more generally, the sum of lognormal-Rician RVs. Such sums arise, for example, when the short-term fading of a radio signal is also taken into account in the co-channel interference power calculation or in the calculation of the total instantaneous power received via a frequency selective channel, when multipath signals undergo independent Rician/Rayleigh fading.

The method can also handle the sum of a mixture of lognormal RVs, Suzuki RVs, and lognormal-Rician RVs. The method also provides an accurate lognormal approximation in a region of interest.

DETAILED DESCRIPTION OF THE PREFERRED EMBODIMENT

Mobile Radio Network

Figure 1:
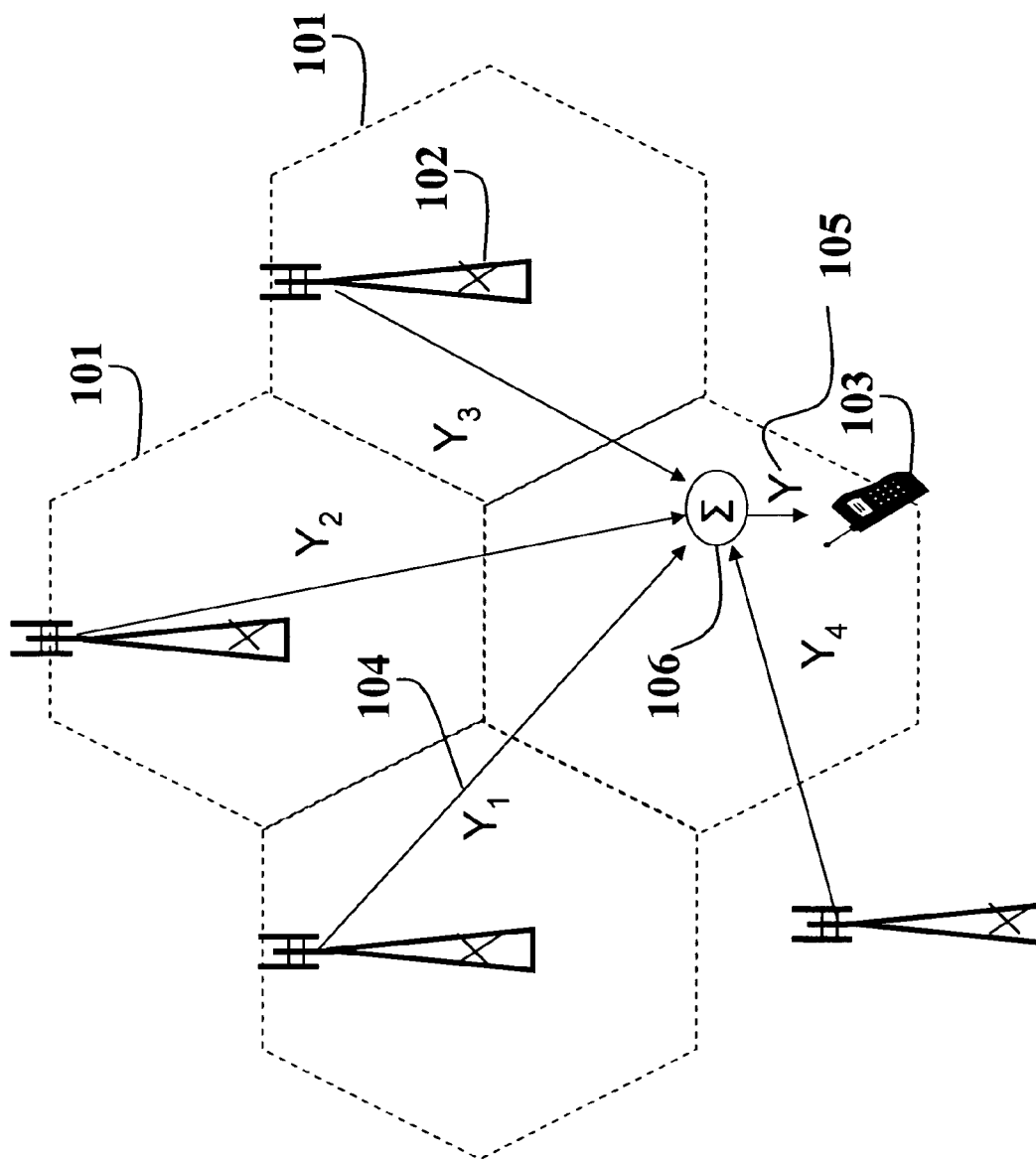
FIG. 1 is a schematic of a wireless network according to one embodiment of the invention.

FIG. 1 shows a mobile radio network 100 that can use a method for approximating a combination of distributions of lognormal random variables (RV) or Suzuki RVs or lognormal-Rice RVs with the distribution of a single lognormal RV according to one embodiment of our invention.

The mobile network 100 includes 'cells' denoted by hexagons 101. A fixed transceiver 102, e.g., a base station or 'cell tower', is located at the center of each cell. The network also includes one or mobile transceivers 103, e.g., mobile telephones. The transmitters broadcast signals $Y_n$ 104. The combined 106 signal Y 105 is received by the receiver.

Co-Channel Interference

In mobile networks, it is important to use the frequency spectrum efficiently. One way to accomplish this is by using the same channel for transmitters in different cells. This requires physical separation between the transmitters so that the interference between the two competing channels, i.e., co-channel interference (CCI), is low enough to provide acceptable quality for users of the system.

One measure of signal quality is the carrier-to-interference ratio (C/I). This ratio compares the strength of a carrier to the combined 106 strength of all interfering signals Y 105. A C/I of about 8 dB has been found to be acceptable. If the mobile transceiver moves away from the base transmitter or moves to a location where interference is higher, then the C/I drops below the acceptable level due to fading. In this case, the 'call' is handed off to another cell having a sufficient signal quality. Fading is most severe in urban environments. In these areas, the signal envelope follows a Rayleigh distribution over short distances and a lognormal distribution over large distances.

Because wireless shadowed signals are lognormally distributed, the probability distribution function for a sum of lognormal signals is desired. However, there is currently no known exact expression for the distribution of this sum.

The signals can also include time-delayed versions of a transmitted signal due to multipath propagation. Multipath propagation occurs when radio signals take different paths from the transmitter to the receiver. One part of the signal goes directly to the receiver, while another part bounces off an obstruction, to arrive at the receiver indirectly. As a result, part of the signal encounters delay and travels a longer path to the destination. Multipath signals also have a lognormal distribution.

Figure 2:
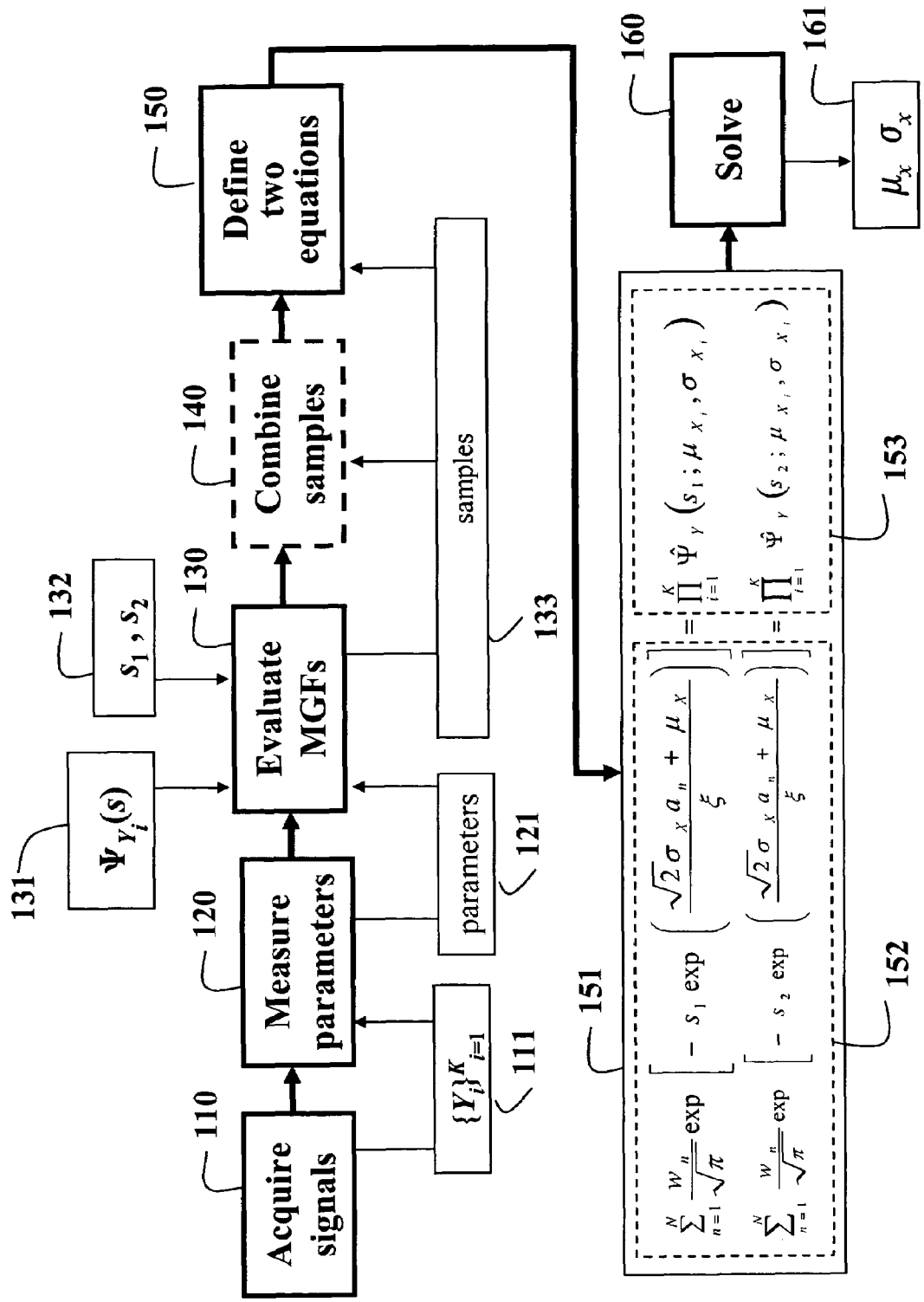
FIG. 2 is a flow diagram for a method for approximating a distribution of a combination of correlated lognormal random variables with a lognormal distribution of a single random variable.

FIG. 2 shows a method for approximating a combination of distributions of lognormal random variables (RV) with a distribution of a single lognormal RV according to one embodiment of the invention. The method relies on the following basic principles:

A lognormal probability distribution function (PDF) can be expressed $$\text{as } p_Y(y) = \frac{1}{\sigma y \sqrt{2\pi}} \exp\left(-\frac{(\xi \log_{10} y - \mu)^2}{2\sigma^2}\right),$$

where $\mu$ is the mean, $\sigma$ is the standard deviation, $\sigma^2$ is the variance, and $$\xi = \frac{\log_{10} e}{10}.$$

The moment generating function (MGF) of a random variable Y can be defined as $$\Psi_Y(s) = E_Y[e^{-sY}] = \int e^{-sy} p_Y(y) dy,$$

where $E_Y[.]$ is the expectation with respect to the random variable Y. Note that the MGF is a function with the variable s as the argument.

Because the method as described herein uses the MGF, the method is occasionally referred to as the MGF method.

It is desired to determine the distribution of the sum 105 $Y = Y_1 + \ldots + Y_K$, of K random variables, $1 \leq i \leq K$. We consider the cases where $Y_i$s are independent lognormal random variables or where the $Y_i$s are correlated lognormal random variables, or the variables $Y_i$s are Suzuki or lognormal-Rician random variables. Any mixture of the above distributions can also be considered. In general, any linear combination of random variables with an arbitrary distribution can be considered.

We approximate the distribution of the sum Y by a lognormal distribution, which is defined by two parameters: the mean $\mu$ and the standard deviation $\sigma$. We evaluate the moment generating functions at a given number of points to determine the above two parameters. Given that closed-form expressions for the MGF are not available for the lognormal distribution, we use a Gauss-Hermite integral to approximate the MGF in one embodiment of the invention. However, other approximation techniques, such as series expansion based on Newton-Cotes formulas or Gaussian quadrature formulas can also be used.

Method Operation

In this description and the appended claims, the meaning and use of 'set' is conventional. A set is a finite collection of one or more elements, in which an order of the elements has no significance, and multiplicity of elements is generally also ignored.

As shown in FIG. 2, signals $\{Y_i\}_{i=1}^{K}$ 111 are acquired 110 in the network. We measure 120 a set of parameters 121 that characterize the signals $Y_i$. The parameters can include the mean $\mu$ and standard deviation $\sigma$ of the power of the signal. The power is the amount of energy transferred by the signals per unit of time.

Another possible parameter is the Rician factor. In a wireless communication network, when there is a line of sight (LoS) path between the transmitter and the receiver, the received signal can be written as the sum of a complex exponential and a narrowband Gaussian process, which are known as the LoS direct component and a diffuse indirect or scatter component (non-LoS or NLoS) respectively. The ratio of the powers of the direct and indirect components is the Rician factor κ. The Rician factor measures a quality of the LoS part of the signal; κ=0 implies that there is no LoS while κ=∞ implies no NLoS component.

If the signals are correlated, then the set of parameters is measured once for the entire set of signals. For example, the mean and variance of each signal and the correlation of any given subset of the signals is measured. If the signals are independent, then the parameters are measured individually for each signal. For example, a mean and variance are measured for each signal.

Next, a set of moment generating functions (MGFs) 131 are evaluated for the set of signals according to the set of parameters 121 at sample points 132, e.g., a first point $s_1$ to obtain a first sample 133 and at a second point $s_2$ 132 to obtain a second sample 133.

If the signals are correlated, then a single MGF is evaluated for the sum of the set of signals. If the signals are independent, then one MGF is evaluated for each signal according to the corresponding parameters measured for the signal to obtain a first and second sample for each MGF.

The points $s_n$ are real numbers. If it is desired to match on the head of the distribution, then the numbers $s_n$ are relatively high, e.g., 0.5 and 1.0. To match on the tails, the numbers are relatively low, e.g., 0.01 and 0.05. How to select values for s for different applications is described in greater detail below. It should also be noted that the MGF can be evaluated at additional points to improve the accuracy of the method.

If the signals are independent, then all of the first samples are combined into a single first sample and all of the second samples are combined into a single second sample by multiplication, in an optional step 140. For correlated signals, the steps 130 and 140 are essentially combined into a single step.

Next, two independent non-linear equations 151 are defined 150. The first equation has an approximation of a moment generation function of a lognormal random variable representing the sum of the set of signals at the first point on the left side 152 of the first equation and the first sample on the right side 153. The second equation has the approximation of the moment generation function of the lognormal random variable representing the combination of the set of signals at the second point on the left side, and the second sample on the right side. It should be noted that if additional points were evaluated, then additional equations can be defined to improve the accuracy.

For independent signals, Equations as shown are described below, see Equations (9a) and (9b). Equations (17a) and (17b) below express the equations 151 for the case when the signals are independent.

The two equations 151, in both the independent and correlated form, have two unknowns, the mean and variance. It is now possible to solve 160 the two equations for the mean and variance 161 using conventional functions, e.g., 'NSolve' in Mathematica software program from Wolfram Research, Inc., Champaign, Ill., USA; and 'fsolve' in Matlab software program from The MathWorks, Natick, Mass., USA. The mean and variance of the lognormal random variable represent a distribution of the sum of the set of the signals.

A more detailed description of the above method follows.

Lognormal Sum

If the signals $Y_1, \ldots, Y_K$ are K independent, but not necessarily identical, then probability distribution functions (PDF) of the lognormal random variables (RVs) are denoted by $p_{Y_i}(x)$, for $1 \leq i \leq K$, respectively. Each signal $Y_i$ can be written as $10^{0.1 X_i}$ such that $X_i$ is a Gaussian random variable with a mean $\mu_{X_i}$ dB and a standard deviation $\sigma_{X_i}$ dB, i.e., $X_i \sim N(\mu_{X_i}, \sigma_{X_i}^2)$. Because the N lognormal RVs are independently distributed, the PDF of the lognormal sum $\Sigma_{i=1}^{K} Y_i$ is given by $$p_{(\Sigma_{i=1}^{K} Y_i)}(x) = p_{Y_1}(x) \otimes p_{Y_2}(x) \otimes \ldots \otimes p_{Y_K}(x), \quad (1)$$

where $\otimes$ denotes a convolution operation.

General closed-form expressions for the sum PDF are not known as neither the PDF nor the CDF of the individual lognormal distributions can be expressed in closed-form.

However, the lognormal sum can be approximated by a new lognormal RV $Y = 10^{0.1 X}$, where X is a Gaussian RV with a mean $\mu_X$ and a variance $\sigma_X^2$. Thus, the problem is now equivalent to estimating the lognormal moments $\mu_X$ and $\sigma_X^2$, given the corresponding statistics of the constituent lognormal RVs, $\{Y_i\}_{i=1}^{K}$.

The prior art Fenton-Wilkinson (F-W) method determines the values of $\mu_X$ and $\sigma_X^2$ by exactly matching the first and second central moments of Y with those of $\Sigma_{i=1}^{K} Y_i$:

$$\int_0^\infty y p_Y(y) dy = \sum_{i=1}^{K} \int_0^\infty y p_{Y_i}(y) dy, \quad (2a)$$

$$\int_0^\infty (y - \mu_T)^2 p_Y(y) dy = \sum_{i=1}^{K} \int_0^\infty (y - \mu_{Y_i})^2 p_{Y_i}(y) dy, \quad (2b)$$

where $\mu_Y$ and $\mu_{Y_i}$ are the means of Y and $Y_i$, respectively. While the F-W method accurately models the tail portion (large values of the argument) of the lognormal sum PDF, it is quite inaccurate near the head portion (small values of the argument) of the sum PDF, especially for large values of $\sigma_{X_i}$, N. C. Beaulieu, A. Abu-Dayya, and P. McLance, "Estimating the distribution of a sum of independent lognormal random variables," *IEEE Trans. Commun.*, vol. 43, pp. 2869-2873, 1995. Because the F-W method determines the logarithmic moments $\mu_X$ and $\sigma_X$ by matching the linear moments $\mu_Y$ and $\sigma_Y$, the mean square error in $\mu_X$ and $\sigma_X$ increases with a decrease in the spread of the mean values or an increase in the spread of the standard deviations of the summands P. Cardieri and T. Rappaport, "Statistical analysis of co-channel interference in wireless communications systems," *Wireless Commun. Mobile Computing*, vol. 1, pp. 111-121, 2001. When trying to model the behavior of 10 $\log_{10}(\Sigma_{i=1}^{K} Y_i)$, the F-W method fails when $\sigma_{X_i} > 4$ dB, G. L. Stüber, *Principles of Mobile Communications*, Kluwer Academic Publishers, 1996.

In contrast, the Schwartz-Yeh (S-Y) method matches the moments in the log-domain, i.e., that method equates the first and second central moments of 10 $\log_{10} Y$ with the moments of 10 $\log_{10}(\Sigma_{i=1}^{K} Y_i)$:

$$\int_0^\infty (\log_{10} y) p_Y(y) dy = \int_0^\infty (\log_{10} y) p_{(\Sigma_{i=1}^{K} Y_i)}(y) dy, \quad (3a)$$

$$\int_0^\infty (10 \log_{10} y - \mu_X)^2 p_Y(y) dy = \int_0^\infty (10 \log_{10} y - \mu_{X_i})^2 p_{(\Sigma_{i=1}^{K} Y_i)}(y) dy, \quad (3b)$$

where $\mu_X$ and $\mu_{X_i}$ are the mean values of $X = 10 \log_{10} Y$ and $X_i = 10 \log_{10} Y_i$, respectively. While the match is exact for K=2, an approximate iterative technique is used for K>2.

The unknowns $\mu_X$ and $\sigma_X$ are evaluated numerically. The S-Y method is more involved than the F-W method because the expectation of the logarithm sum cannot be expressed directly in terms of the moments of the summands. As described above, the S-Y method is inaccurate near the tail portion of the distribution function and can significantly underestimate small values of the CCDF, N. C. Beaulieu, A. Abu-Dayya, and P. McLance, "Estimating the distribution of a sum of independent lognormal random variables," *IEEE Trans. Commun.*, vol. 43, pp. 2869-2873, 1995.

Because the moments can be interpreted as weighted integrals of the PDF, both the F-W method and the S-Y method can be generalized by the following system of equations:

$$\int_0^\infty w_m(y) p_Y(y) dy = \int_0^\infty w_m(y) p_{(\sum_{i=1}^K Y_i)}(y) dy, \quad (4)$$

for $m = 1, 2$.

The F-W method uses a weight functions $w_1(y)=y$ and $w_2(y)=(y-\mu_Y)^2$, both of which monotonically increase with y. Thus, approximation errors in the tail portion of the sum PDF are penalized to a greater extent. This explains why the F-W method tracks the tail portion well. On the other hand, the S-Y method employs a weight function $w_1(y)=\log_{10} y$ and $w_2(y)=(\log_{10} y-\mu_X)^2$. Due to the singularity of $\log_{10} y$ at y=0, mismatches near the origin are severely penalized by both these weight functions. Compared to the F-W method, the S-Y method also accords a lower penalty to errors in the PDF tail. For these reasons, the S-Y method does a better job tracking the head portion of the distribution function. However, both the F-W and the S-Y methods use fixed weight functions and offer no way of overcoming their respective shortcomings.

Similarly, Schleher's cumulants matching method accords polynomially increasing penalties to the approximation error in the tail portion of the PDF. This is because the first three cumulants are, in effect, the first three central moments of an RV. By plotting the x-axis in a dB scale on lognormal paper, the Beaulieu-Xie method also gives more weight to the tail portion.

Lognormal Sum Approximation Using Gauss-Hermite Expansion of MGF

The MGF of the sum of independent RVs can be expressed as the product of the individual MGFs. That is, the MGF of the sum can be written directly in terms of the MGFs of the individual RVs. The MGF of the RV Y is defined as $$\Psi_Y(s) = \int_0^\infty \exp(-sy) p_Y(y) dy, \text{ for real } s \geq 0. \quad (5)$$

It can be seen from Equation (5) that the MGF can also be interpreted as the weighted integral of the PDF $p_Y(y)$, with the weight function being the exponential function exp(-sy), which is monotonically decreasing for real and positive values of s. Varying s from 0 to $\infty$ provides a mechanism for adjusting, as required, the penalties allocated to errors in the head and tail portions of the sum PDF.

Figure 3:
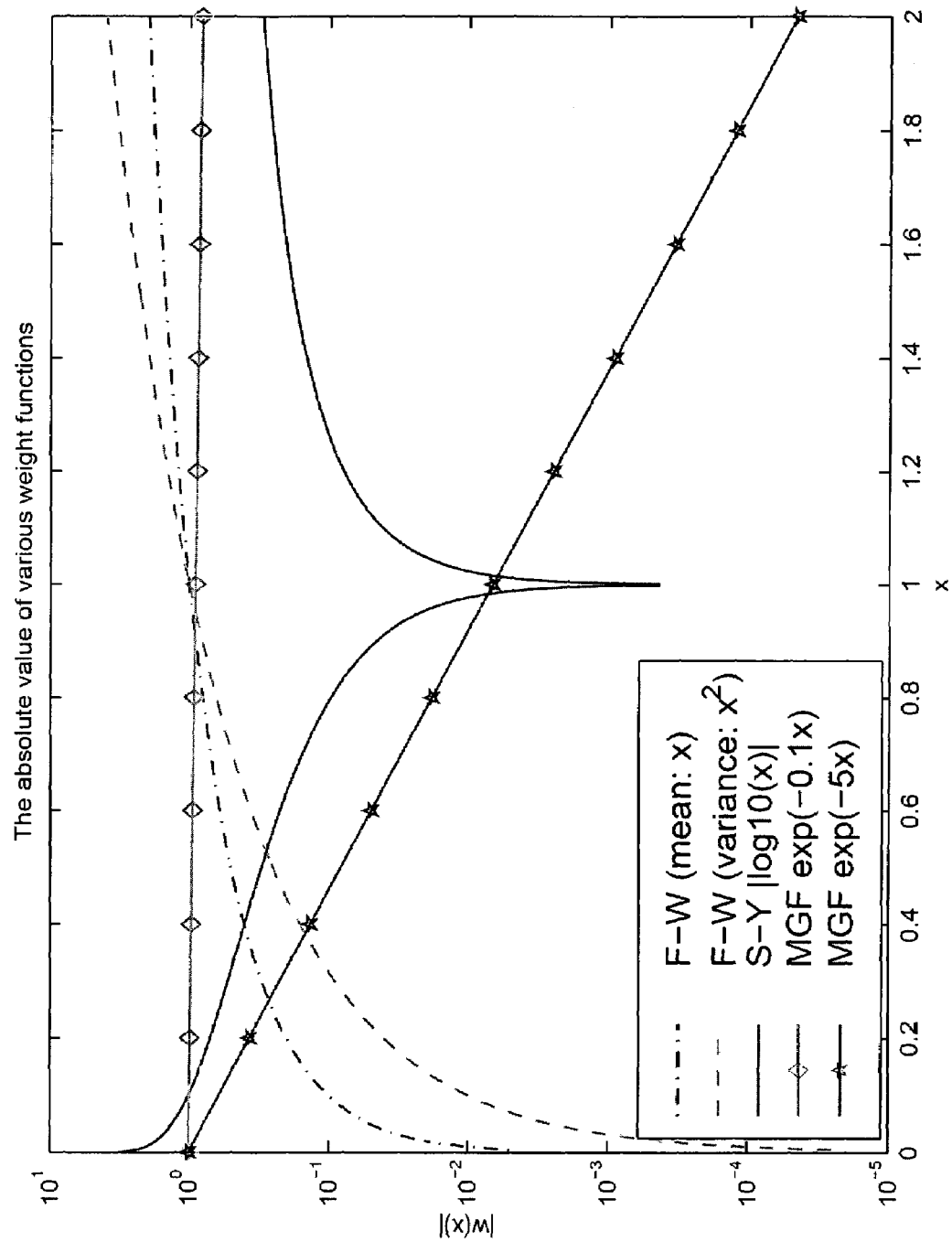
FIG. 3 is a graph comparing weight functions.

FIG. 3 compares the absolute values of various weight functions for the F-W and Y-S methods and the MGF method according to an embodiment of the invention.

If the lognormal RVs $\{Y_i\}_{i=1}^K$ are independently distributed, then the MGF of the lognormal sum $\sum_{i=1}^K Y_i$ can be written as $$\Psi_{(\sum_{i=1}^K Y_i)}(s) = \prod_{i=1}^K \Psi_{Y_i}(s). \quad (6)$$

Based on the above description, we can see that the MGF posses two desirable properties. First, the MGF is an adjustable weighted integral of the PDF. Second, the sum can be obtained by evaluating 130 the MGFs individually and taking the product 140 of the resulting samples. These two properties make the MGF a preferred component for the lognormal sum approximation method according to an embodiment of the invention.

MGF-Based Lognormal Sum Approximation

The MGF-based lognormal sum approximation method according to an embodiment of the invention uses a closed-form expression that approximates the MGF of lognormal RV. While no general closed-form expression for the lognormal MGF is available, for a real s the lognormal MGF can be expressed by a series expansion based on a Gauss-Hermite integration.

The MGF of a lognormal RV X for real s can be written as $$\Psi_Y(s) = \int \exp(-sy) \frac{\xi}{y \sigma_X \sqrt{2\pi}} \exp\left[-\frac{(\xi \log_e y - \mu_X)^2}{2\sigma_X^2}\right] dy, \quad (7a)$$

$$= \sum_{n=1}^N \frac{w_n}{\sqrt{\pi}} \exp\left[-s \exp\left(\frac{\sqrt{2}\sigma_X a_n + \mu_X}{\xi}\right)\right] + R_N, \quad (7b)$$

where $\mu_X$ and $\sigma_X$ are the mean and standard deviation of the Gaussian RV $X = 10 \log_{10} Y$. Equation (7b) is the Gauss-Hermite series expansion of the MGF function, N is the Hermite integration order, $\xi = 10/\log_e 10$ is a scaling constant, $R_N$ is a remainder term. The weights, $w_i$, and abscissas, $a_i$, for N up to 20 are tabulated by M. Abramowitz and I. Stegun, *Handbook of mathematical functions with formulas, graphs, and mathematical tables*. Dover, 9 ed., 1972.

From Equation (7b), we can define the Gauss-Hermite representation of the MGF by removing $R_N$ as follows:

$$\hat{\Psi}_Y(s; \mu_X, \sigma_X) = \sum_{n=1}^N \frac{w_n}{\sqrt{\pi}} \exp\left[-s \exp\left(\frac{\sqrt{2}\sigma_X a_n + \mu_X}{\xi}\right)\right]. \quad (8)$$

The lognormal sum $\sum_{i=1}^K Y_i$ is then approximated by a lognormal RV $Y=10^{0.1X}$, where $X \sim N(\mu_X, \sigma_X^2)$, by matching the MGF of Y with the MGF of the lognormal sum $\sum_{i=1}^K Y_i$ at two different, real and positive points of the MGF, namely, $s_1$ and $s_2$. It should be understood, the values $s_1$ and $s_2$ can also be complex numbers.

This defines 150 two independent equations 151 with two unknowns 161, the mean $\mu_X$ and the standard deviation $\sigma_X$:

$$\sum_{n=1}^N \frac{w_n}{\sqrt{\pi}} \exp\left[-s_1 \exp\left(\frac{\sqrt{2}\sigma_X a_n + \mu_X}{\xi}\right)\right] = \prod_{i=1}^K \hat{\Psi}_Y(s_1; \mu_{X_i}, \sigma_{X_i}), \quad (9a)$$

and $$\sum_{n=1}^{N}\frac{w_n}{\sqrt{\pi}}\exp\left[-s_2\exp\left(\frac{\sqrt{2}\,\sigma_X a_n+\mu_X}{\xi}\right)\right]=\prod_{i=1}^{K}\hat{\Psi}_Y(s_2;\mu_{X_i},\sigma_{X_i}), \qquad (9b)$$

where $\mu_{X_i}$ and $\sigma_{X_i}$ are the lognormal moments of the lognormal RV $Y_i=10^{0.1X_i}$, i.e., $X_i \sim N(\mu_{X_i}, \sigma_{X_i}^2)$. Note that the right sides 153 of the above two equations 151 are constant numbers, i.e., the samples at the points that only needs to be evaluated one time for each MGF. The non-linear equations can be solved 160 numerically using conventional functions to obtain $\mu_X$ and $\sigma_X$ 161.

Better estimates of $\mu_X$ and $\sigma_X$ are obtained by increasing the Hermite integration order N. Conversely, reducing N decreases the computational complexity.

Figure 4:
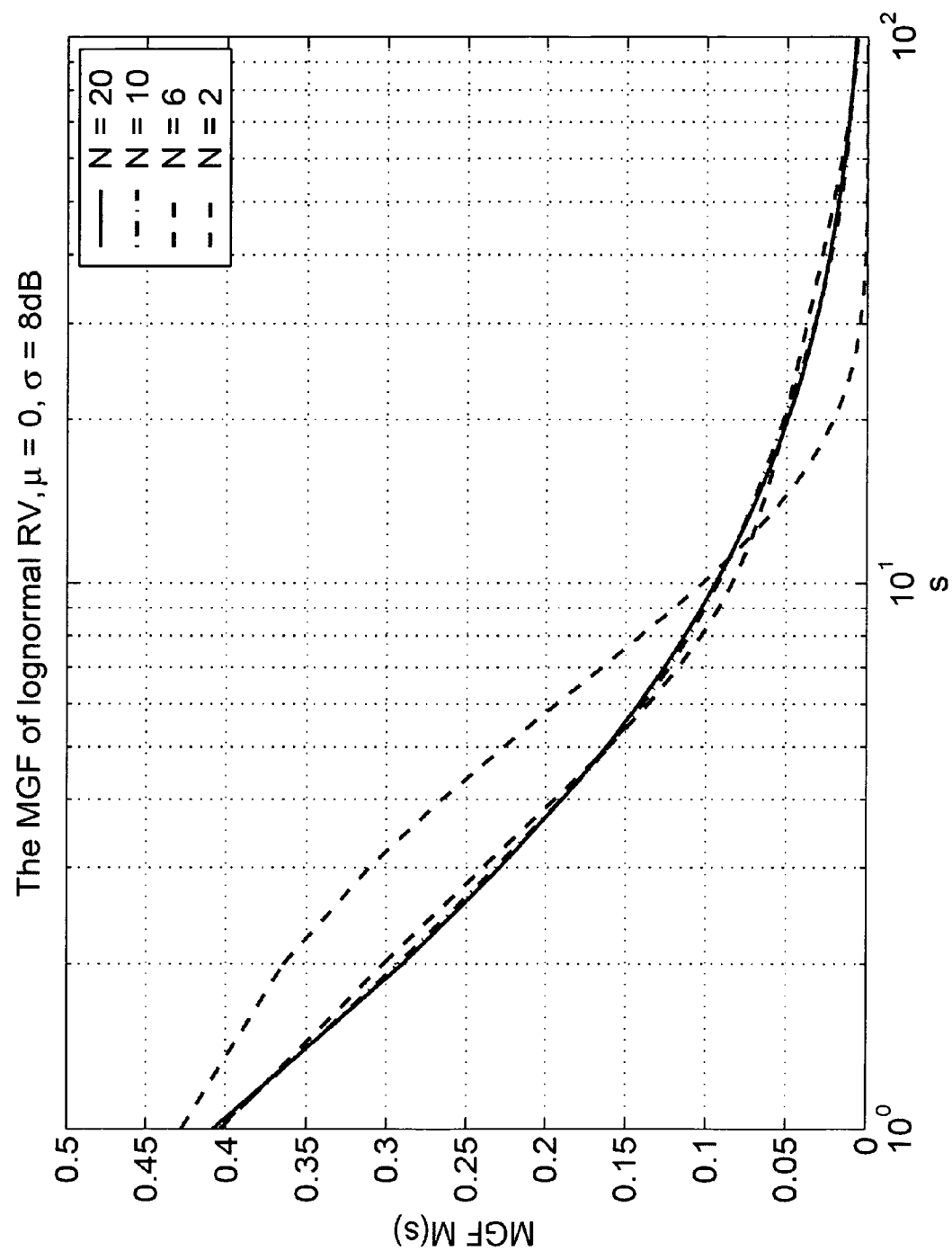
FIG. 4, is graph comparing different Hermite integration orders.

FIG. 4 shows the impact of N on the accuracy of the Gauss-Hermite representation of the MGF. We find that N=8 is sufficient to accurately solve 160 for $\mu_X$ and $\sigma_X$ 161, which is small compared to the 20 to 40 terms required to achieve a comparable accuracy in the S-Y method, C.-L. Ho, "Calculating the mean and variance of power sums with two log-normal components," *IEEE Trans. Veh. Technol.*, vol. 44, pp. 756-762, 1995.

Furthermore, unlike the S-Y method, our method requires no iteration in K. The right side of equations (9a) and (9b) is evaluated 130 at the start of the method for the two points 132 $s=s_1$ and $s=s_2$ of the MGF 131.

Most important, as highlighted before, the penalty for PDF mismatch can be adjusted by selecting the points $s_1$ and $s_2$ appropriately. Increasing their values penalizes errors in approximating the head portion of the sum PDF, while reducing their values penalizes errors in the tail portion.

The inevitable trade-off that needs to be made in approximating both the head and tail portions of the PDF can now be done according to the invention, depending on the application.

For example, when the lognormal sum arises because various signal components add up, the main performance metric is the outage probability. For this, the tail of the CDF needs to be determined accurately. On the other hand, when the lognormal sum appears as a denominator term, for example, when the powers from co-channel interferers add up in the signal to noise plus interference ratio calculation, it is the head portion of the sum PDF that needs to be calculated accurately.

The method according to an embodiment of the invention can handle both of these applications by using different matching point pairs $(s_1, s_2)$. Guidelines for selecting the points $(s_1, s_2)$ are described below.

Sum of Correlated Lognormal Random Variables

We now consider the general case of K correlated or dependent lognormal RVs, $\{Y_i\}_{i=1}^{K}$, with corresponding Gaussian RVs, $\{X_i\}_{i=1}^{K}$, which have an arbitrary correlation matrix C. We derive the set of equations that yield the parameters for the approximating lognormal RV.

When K lognormal RVs, $\{Y_i\}_{i=1}^{K}$, are correlated, the corresponding Gaussian RVs, $X_i=10\log_{10}Y_i$, follow a joint distribution $$p_x(x)=\frac{1}{(2\pi)^{K/2}|C|^{1/2}}\exp\left(-\frac{(x-\mu)^{\perp}C^{-1}(x-\mu)}{2}\right), \qquad (10)$$

where C is a correlation matrix and $\mu$ is a vector of means. The summed MGF of $Y_1+\ldots+Y_K$ can be written as:

$$\Psi^{(c)}_{(\Sigma_{k=1}^{K}Y_k)}(s)=\int_{-\infty}^{\infty}\cdots\int_{-\infty}^{\infty}\frac{1}{(2\pi)^{K/2}|C|^{1/2}} \qquad (11)$$

$$\prod_{i=1}^{K}\Box\exp\left(-s\left[\exp\left(\frac{x_i}{\xi}\right)\right]\right)\exp\left(-\frac{(x-\mu)^{\perp}C^{-1}(x-\mu)}{2}\right)dx$$

where the vector $\mu$ is the mean vector, C is the covariance matrix of the K Gaussian RVs, |.| denotes the determinant, and $(.)^{\perp}$ denotes the Hermitian transpose operator.

Let $C_{sq}$ be the square root of the correlation matrix C, i.e., $C=C_{sq}C_{sq}^{\perp}$. When the decorrelating transformation, from the given vector x to a transformed vector z, $x=\sqrt{2}C_{sq}z+\mu$ is used, $x_k$ is given by $$x_k=\sqrt{2}\sum_{j=1}^{K}c'_{kj}z_j+\mu_k, k=1,\ldots,K, \qquad (12)$$

where $c'_{kj}$ is the $(k,j)^{th}$ element of $C_{sq}$. Therefore, the MGF equation becomes $$\Psi^{(c)}_{(\Sigma_{k=1}^{K}Y_k)}(s)=\int_{-\infty}^{\infty}\cdots \qquad (13)$$

$$\int_{-\infty}^{\infty}\frac{1}{\pi^{K/2}}\prod_{k=1}^{K}\exp\left(-s\left[\exp\left(\frac{\sqrt{2}}{\xi}\sum_{j=1}^{K}c'_{kj}z_j+\frac{\mu_k}{\xi}\right)\right]\right)\exp(-z^{\perp}z)dz$$

Taking the Gauss-Hermite expansion with respect to $z_1$ yields $$\Psi^{(c)}_{(\Sigma_{k=1}^{K}Y_k)}(s)=\int_{-\infty}^{\infty}\cdots\int_{-\infty}^{\infty}\frac{1}{\pi^{(K-1)/2}}\left(-\sum_{i=2}^{K}|z_i|^2\right)\times\sum_{k=1}^{N}\frac{w_{n_1}}{\sqrt{\pi}}\prod_{k=1}^{K}\exp \qquad (14)$$

$$\left(-s\left[\exp\left(\frac{\sqrt{2}}{\xi}\sum_{j=2}^{K}c'_{kj}z_j+\frac{\sqrt{2}}{\xi}c'_{k1}a_{n_1}+\frac{\mu_k}{\xi}\right)\right]\right)dz_2\cdots dz_K+R_N^{(1)}$$

where $R_N^{(1)}$ is a remainder term. Proceeding in a similar manner for $z_2,\ldots z_K$, we obtain $$\Psi^{(c)}_{(\Sigma_{k=1}^{K}Y_k)}(s)= \qquad (15)$$

$$\sum_{n_K=1}^{N}\cdots\sum_{n_1=1}^{N}\frac{w_{n_1}\cdots w_{n_K}}{\pi^{K/2}}\prod_{k=1}^{K}\exp\left(-s\left[\frac{\sqrt{2}}{\xi}\sum_{l=1}^{K}c'_{kl}a_{n_l}+\frac{\mu_k}{\xi}\right]\right)+R_N^{(K)},$$

where $R_N^{(K)}$ is the remainder term. Rearranging the terms and dropping the remainder term results in the following definition of the MGF approximate function $\hat{\Psi}^{(c)}_{(\Sigma_{k=1}^{K}Y_k)}(s;\mu,C)$:

$$\hat{\Psi}^{(c)}_{(\Sigma_{k=1}^{K} Y_k)}(s; \mu, C) = \sum_{n_1=1}^{N} \cdots \sum_{n_K=1}^{N} \left[ \prod_{k=1}^{K} \frac{w_{n_k}}{\sqrt{\pi}} \exp\left(-s \exp\left(\frac{\mu_k}{\xi}\right)\right) \right] \quad (16)$$

$$\exp\left(-s \sum_{k=1}^{K} \left[ \exp\left(\frac{\sqrt{2}}{\xi} \sum_{j=1}^{K} c'_{kj} a_{n_j}\right) \right] \right)$$

Note that $c'_{ij}$ can be written in closed-form as a function of the elements of C for certain special matrices C. In other cases, this needs to be done numerically. In general, the eigen-decomposition of C is $U\Lambda U^{\perp}$, where U is the eigenspace of C and the diagonal matrix $\Lambda$ contains the eigenvalues of C. Then $C_{sq} = U\Lambda^{1/2}$.

Therefore, the sum, $Y_1 + \ldots + Y_K$ of K correlated lognormal RVs can be approximated using a single lognormal RV, Y, using two equations:

$$\hat{\Psi}_Y(s; \mu_Y, \sigma_Y) = \hat{\Psi}^{(c)}_{(\Sigma_{k=1}^{K} Y_k)}(s; \mu, C), \text{ at } i = 1, \text{ and} \quad (17a)$$

$$\hat{\Psi}_Y(s; \mu_Y, \sigma_Y) = \hat{\Psi}^{(c)}_{(\Sigma_{k=1}^{K} Y_k)}(s; \mu, C), \text{ at } i = 2, \quad (17b)$$

where $\hat{\Psi}^{(c)}_{(\Sigma_{k=1}^{K} Y_k)}(s; \mu, C)$ is given by Equation (16) and $\hat{\Psi}_Y(s; \mu_Y, \sigma_Y)$ is given by Equation (8). The value of N=8 is accurate for the case of correlated signals, as well.

For the special case of the sum of two zero-dB mean lognormal RVs with correlation coefficient $\rho$ and standard deviation $\sigma$ dB, the MGF $\hat{\Psi}^{(c)}_{(Y_1+Y_2)}(s)$ can be written in closed-form in terms of $\rho$ as $$\hat{\Psi}^{(c)}_{(Y_1+Y_2)}(s) = \sum_{n=1}^{N} \sum_{m=1}^{N} \frac{w_n w_m}{\pi} \quad (18)$$

$$\exp\left(-s \left[ \exp\left(\frac{\sqrt{2} \sigma a_m}{\xi}\right) + \exp\left(\frac{\sqrt{2(1-\rho^2)} \sigma a_n + \sqrt{2} \sigma \rho a_m}{\xi}\right) \right] \right)$$

Sum of Independent Suzuki or Lognormal-Rician RVs

The Suzuki RV is a product of a lognormal RV and a Rayleigh fading RV. When a line-of-sight (LoS) component is also present, we obtain a lognormal-Rician RV, which is a product of a lognormal RV and a Rician-fading RV, expressed as $$W = Z \cdot 10^{0.1X}, \quad (19)$$

where Z is a Rician RV with unit power and Riceancoefficient $\kappa$. Setting $\kappa$ equal to zero results in a Suzuki RV. The sum of K independent lognormal-Rician RVs can also be accurately represented as a single lognormal RV, as follows.

We apply the Gauss-Hermite integration to come up with an approximation to the MGF of the lognormal-Rice RV, as described above, and neglect the remainder term. This results in the following approximation to the MGF for the $k^{th}$ RV:

$$\hat{\Psi}_{S_k}(s; \mu_k, \sigma_k, \kappa_k) = \sum_{i=1}^{K} \frac{w_i(1+\kappa_k)/\sqrt{\pi}}{1+\kappa_k + s\exp\left(\frac{\sqrt{2}\sigma_k a_i}{\xi} + \frac{\mu_k}{\xi}\right)} \quad (20)$$

$$\exp\left(\frac{s\kappa_k \exp\left(\frac{\sqrt{2}\sigma_k a_i}{\xi} + \frac{\mu_k}{\xi}\right)}{1+\kappa_k + s\exp\left(\frac{\sqrt{2}\sigma_k a_i}{\xi} + \frac{\mu_k}{\xi}\right)}\right),$$

where $\mu_k$ and $\sigma_k$ are the logarithmic mean and logarithmic standard deviation of the shadowing component, and $\kappa_k$ is the Rician factor of the $k^{th}$ summand.

Therefore, the sum of K lognormal-Rician RVs, $S_1 + \ldots + S_K$, can be approximated by a single lognormal RV, Y, by defining 150 the following two equations 151

$$\hat{\Psi}_Y(s_i; \mu_Y, \sigma_Y) = \prod_{k=1}^{K} \hat{\Psi}_{S_k}(s_i; \mu_k, \sigma_k, \kappa_k), \text{ at } i = 1 \text{ and } 2, \quad (21)$$

where, as before, $\mu_Y$ and $\sigma_Y$ are the unknowns 161 to be solved 160. All other quantities in Equation (21) are known. The equation is evaluated at points $s_1$ and $s_2$ using Equation (20), while $\hat{\Psi}_Y(s_i; \mu_Y, \sigma_Y)$ is given by Equation (8).

In another embodiment of the invention, the method can also handle a mixture of different types of variables by using the corresponding expressions for the approximate MGFs for lognormal and lognormal-Rician or Suzuki RVs.

EXAMPLES APPLICATIONS

In the examples below, we plot the CDF and complementary CDF (CCDF) and use these results to provide guidelines for selecting points 132 $s_1$ and $s_2$ that work well in many applications. Small values of the CDF reveal the accuracy in tracking the head portion of the PDF, while small values of the CCDF reveal the accuracy in tracking the tail portion of the PDF.

Sum of Independent Lognormal RVs

Figure 5:
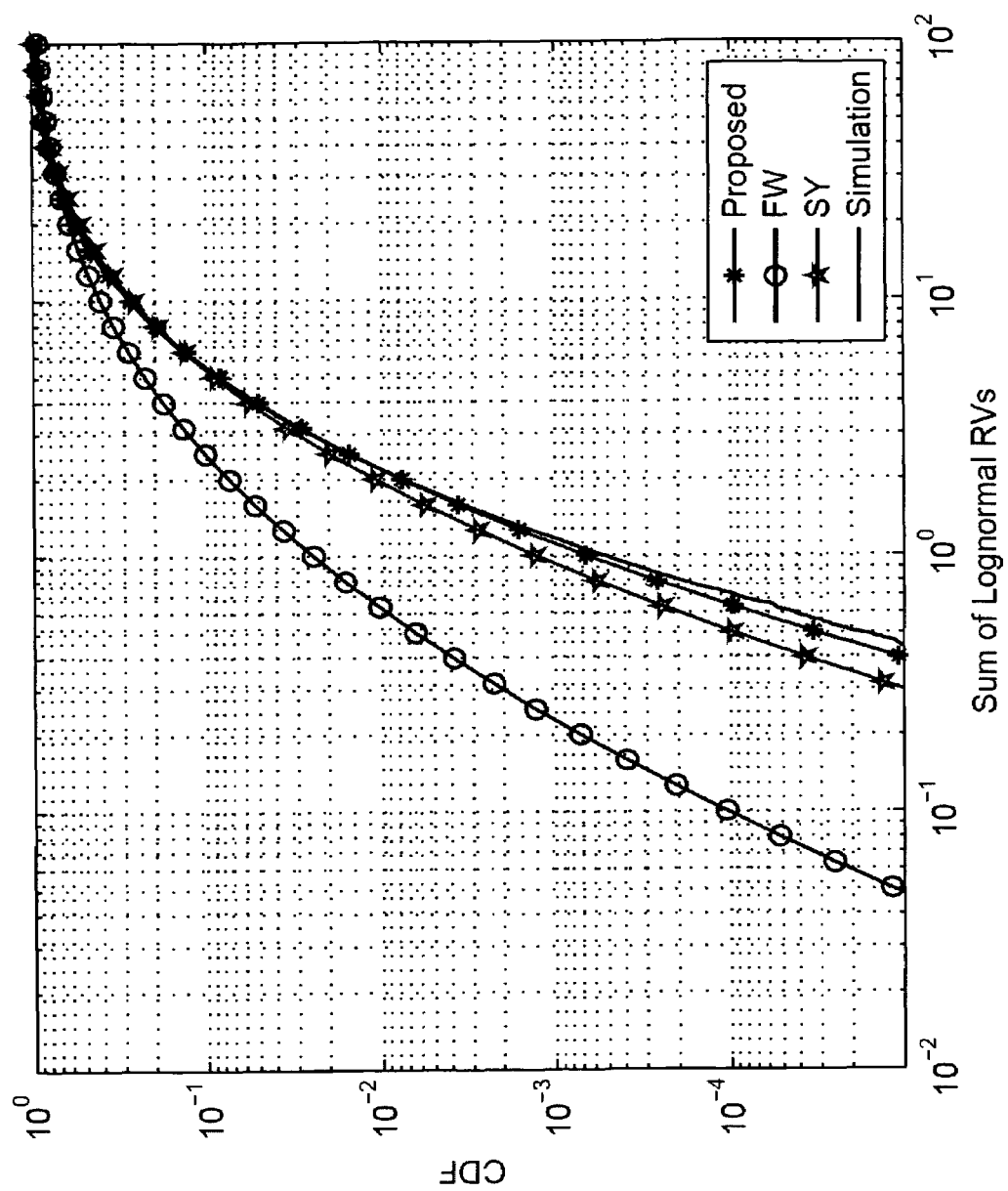
FIGS. 5 and 6 are graphs of the CDF and CCDF of the sum of six uncorrelated lognormal random variables.

FIG. 5 plots the CDF of the sum of six independent lognormal RVs using Monte Carlo simulations, and compares the results with the MGF method and the F-W and S-Y approximations. All the summands have a logarithmic standard deviation of $\sigma=8$ dB and a mean of $\mu=0$ dB. It can be seen that the MGF method matches the head portion of the CDF very well when $s_1$ and $s_2$ are, respectively, 0.2 and 1, and is more accurate than both the F-W and the S-Y methods.

Figure 6:
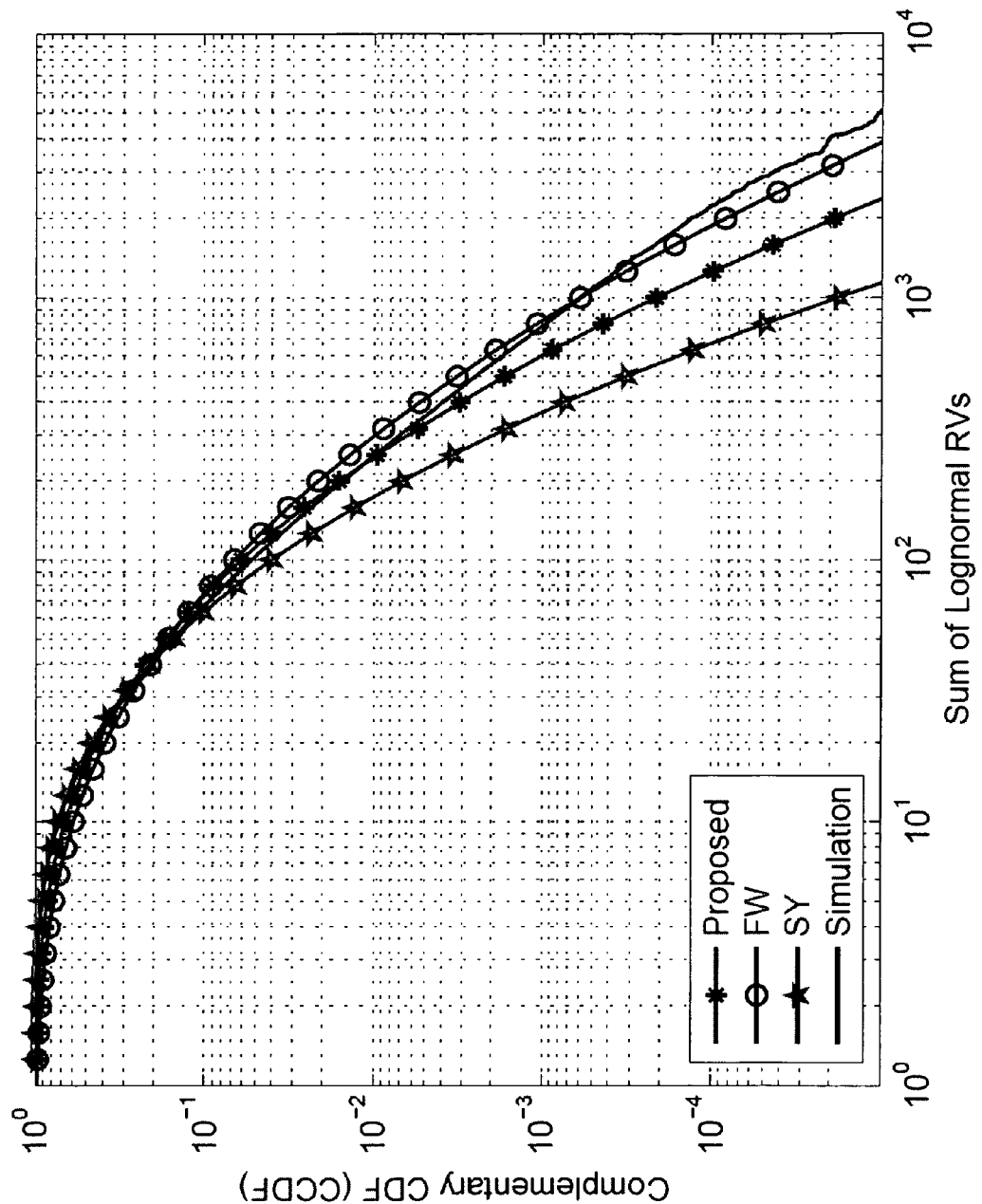

FIG. 6 plots the CCDF for the RVs of FIG. 5. While the S-Y method diverges from the actual CCDF in this scenario, the MGF method matches the simulation results well for $(s_1, s_2) = (0.001, 0.005)$, and is similar to the F-W method in terms of accuracy.

Figure 7:
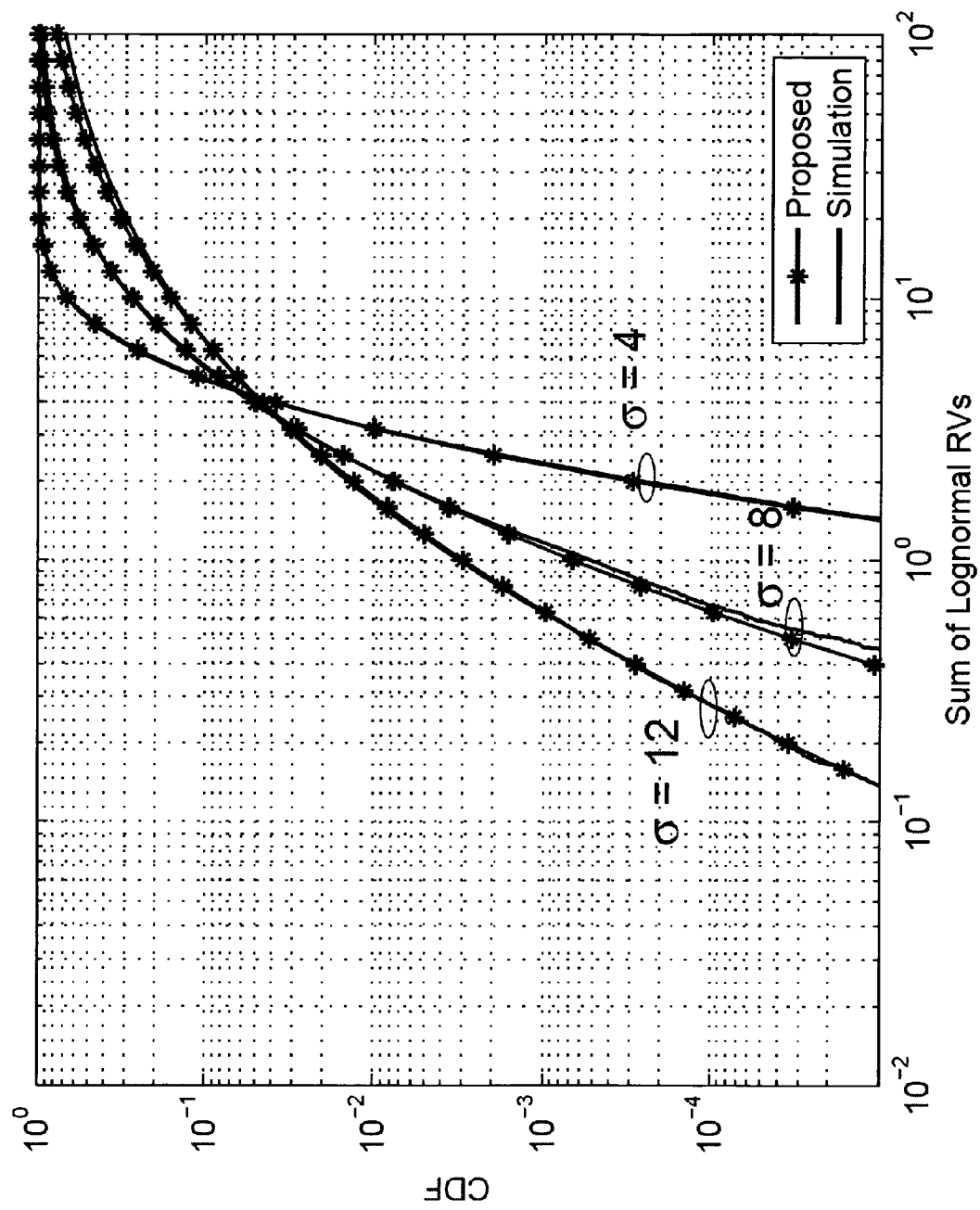
FIG. 7 is a graph of the effect of variance on the accuracy of approximating the CDF.
Figure 8:
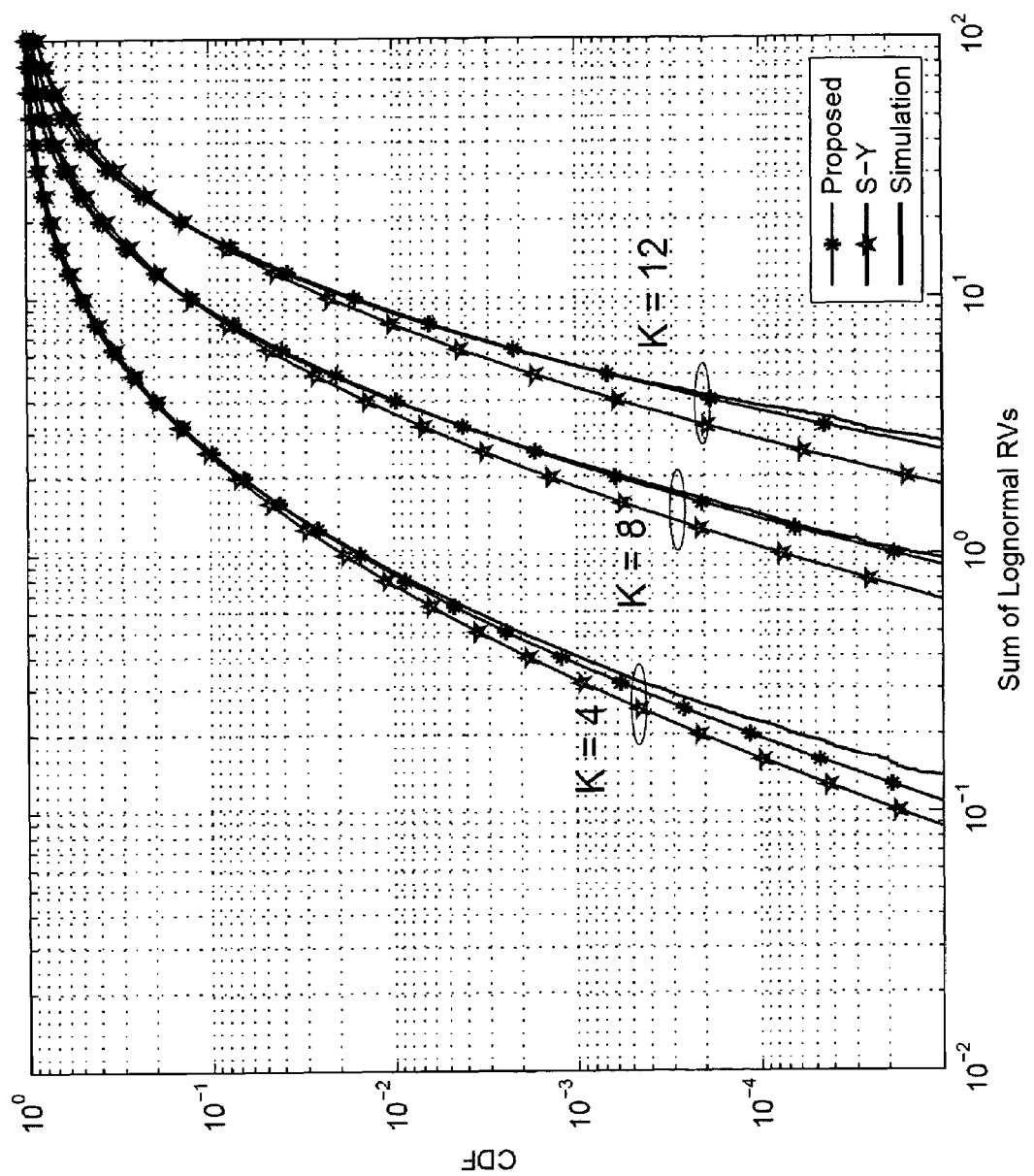
FIG. 8 is a graph of the effect of number of summands on the accuracy of appoximating the CDF.

FIG. 7 shows the accuracy of the approximation as the standard deviation, $\sigma$, is varied from 4 dB to 12 dB. The graph shows the CDF for K=6 with $\mu=0$ dB for the summands. The effect of increasing the number of summands is shown in FIG. 8, which plots the CDF for different K. It can be seen from FIGS. 7 and 8 that $(s_1, s_2) = (1, 0.2)$ provides a good fit for various values of $\sigma$ and K for approximating the head portion of the PDF. Similarly, $(s_1, s_2)=(0.001, 0.005)$ is suitable for approximating the tail of the CCDF.

Sum of Correlated Lognormal RVs

We now consider the sum of K correlated lognormal RVs, with the correlation matrix set as:

$$C = \begin{bmatrix} 1 & \rho & \cdots & \rho^{K-1} \\ \rho & 1 & \cdots & \rho^{K-2} \\ & & \ddots & \\ \rho^{K-1} & \rho^{K-2} & \cdots & 1 \end{bmatrix}, \quad (22)$$

where $\rho$ is the correlation coefficient between any two successive RVs. The logarithmic mean of the RVs is 0 dB.

Figure 9:
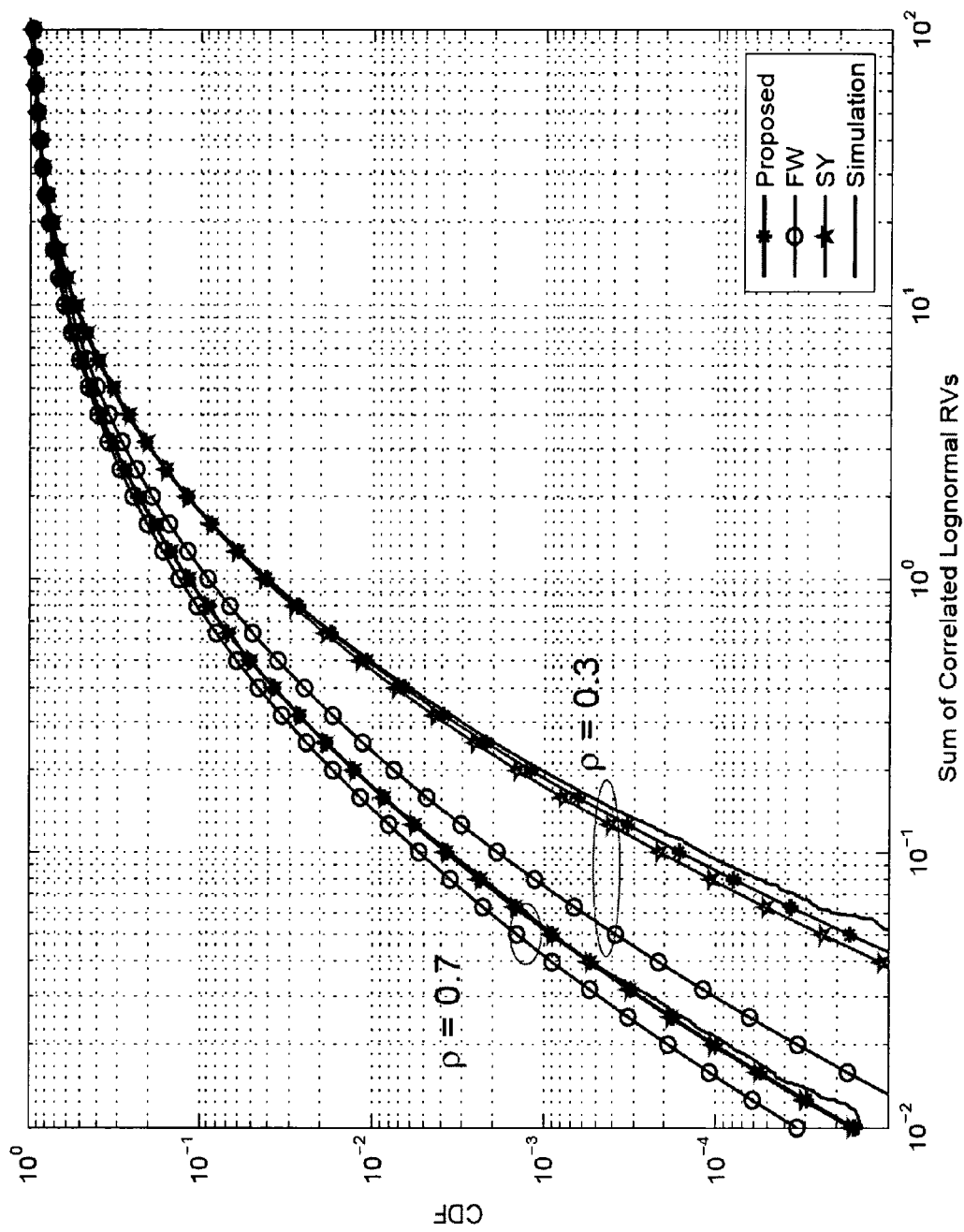
FIGS. 9 and 10 are graphs comparing the accuracy of approximation techniques for the sum of correlated lognormal random variables.
Figure 10:
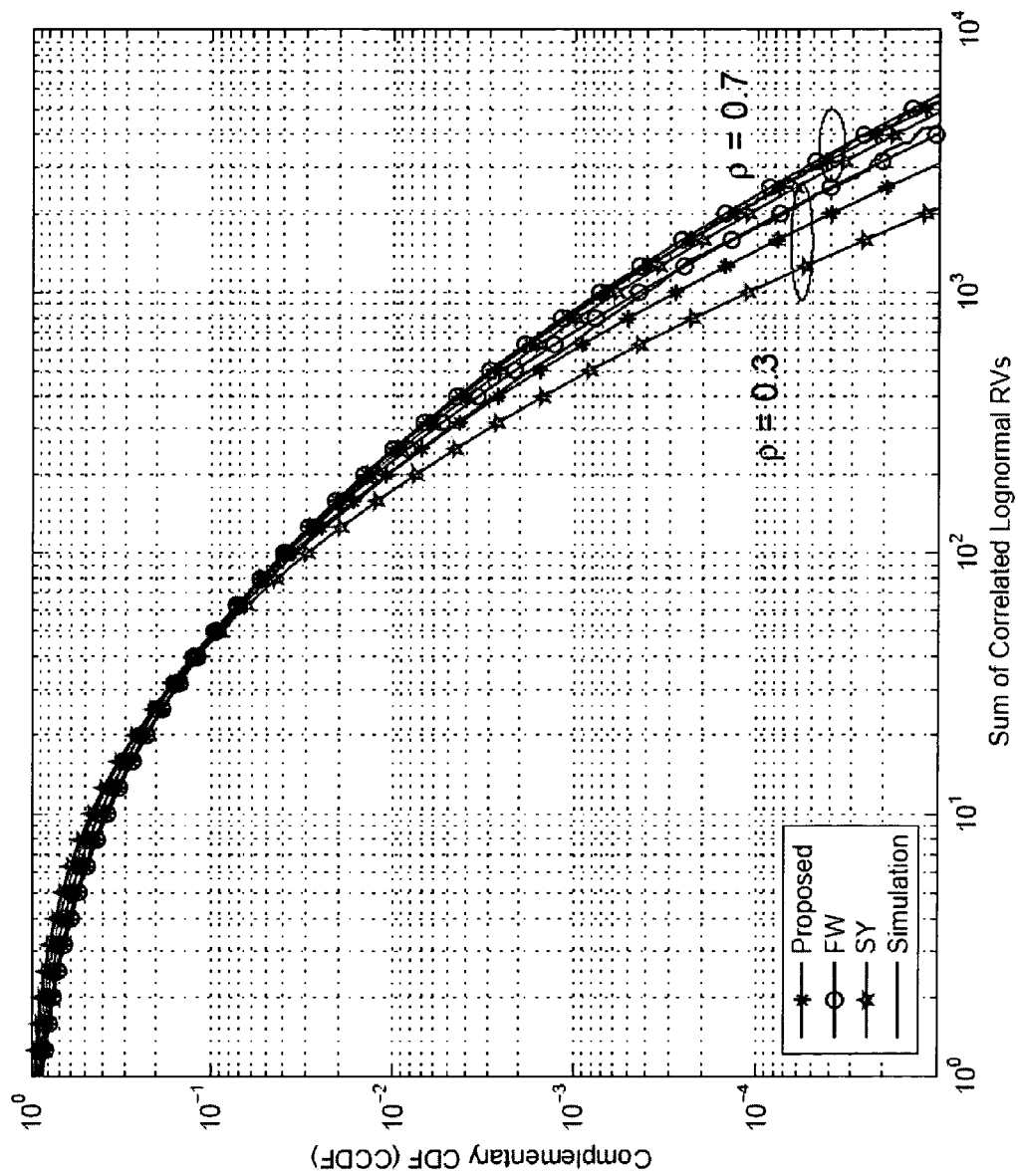

The CDF and CCDF of the sum of four correlated lognormal RVs are compared in FIGS. 9 and 10 for the case in which all the constituent RVs have $\sigma=8$ dB and $\mu=0$ dB. The CDF of the lognormal distribution with parameters estimated using Equation (17) is compared with the CDFs of the lognormal distributions with parameters from the F-W and S-Y extensions. Two values of correlation coefficient are considered: $\rho=0.3$ and $\rho=0.7$. It can be seen that the MGF method can accurately track the CDF of the correlated lognormal sum, and is marginally better than the S-Y extension method. The F-W extension is the least accurate of all the methods. In case of the CCDF, the accuracy of the MGF method is comparable to that of the F-W extension, and the S-Y extension is the least accurate. As expected, for larger correlation coefficients, all the methods can accurately track the CDF and the CCDF.

Figure 11:
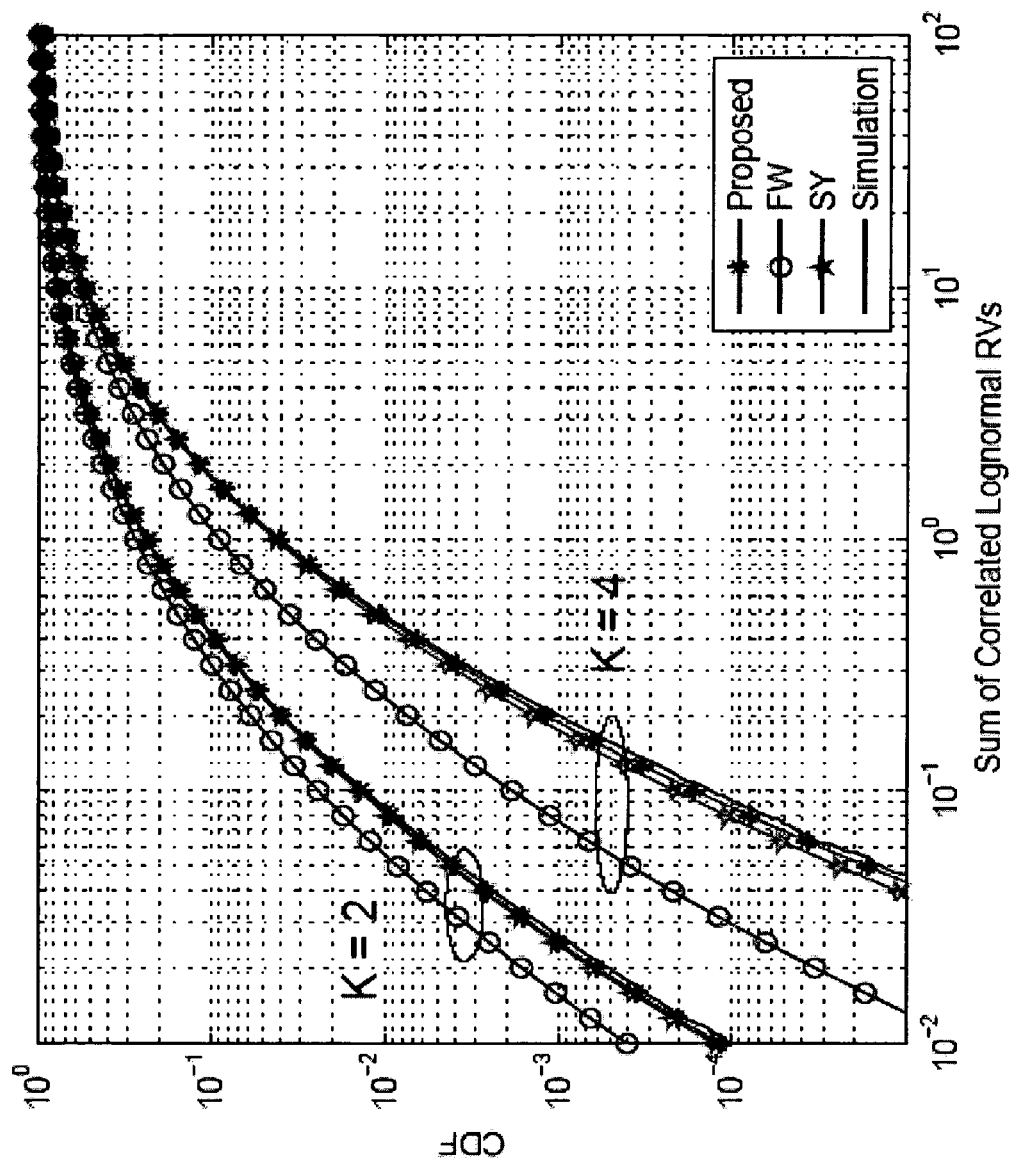
FIG. 11 is a graph of the effect of the number of summands on the accuracy of approximating the CDF.

FIG. 11 plots the CDF of the sum of different numbers of correlated lognormal RVs with $\rho=0.3$ and shows that the MGF method is accurate in all cases. As expected, as K decreases, accuracy of the F-W and the S-Y methods improves.

Sum of Independent Suzuki and Lognormal-Rician RVs

Figure 12:
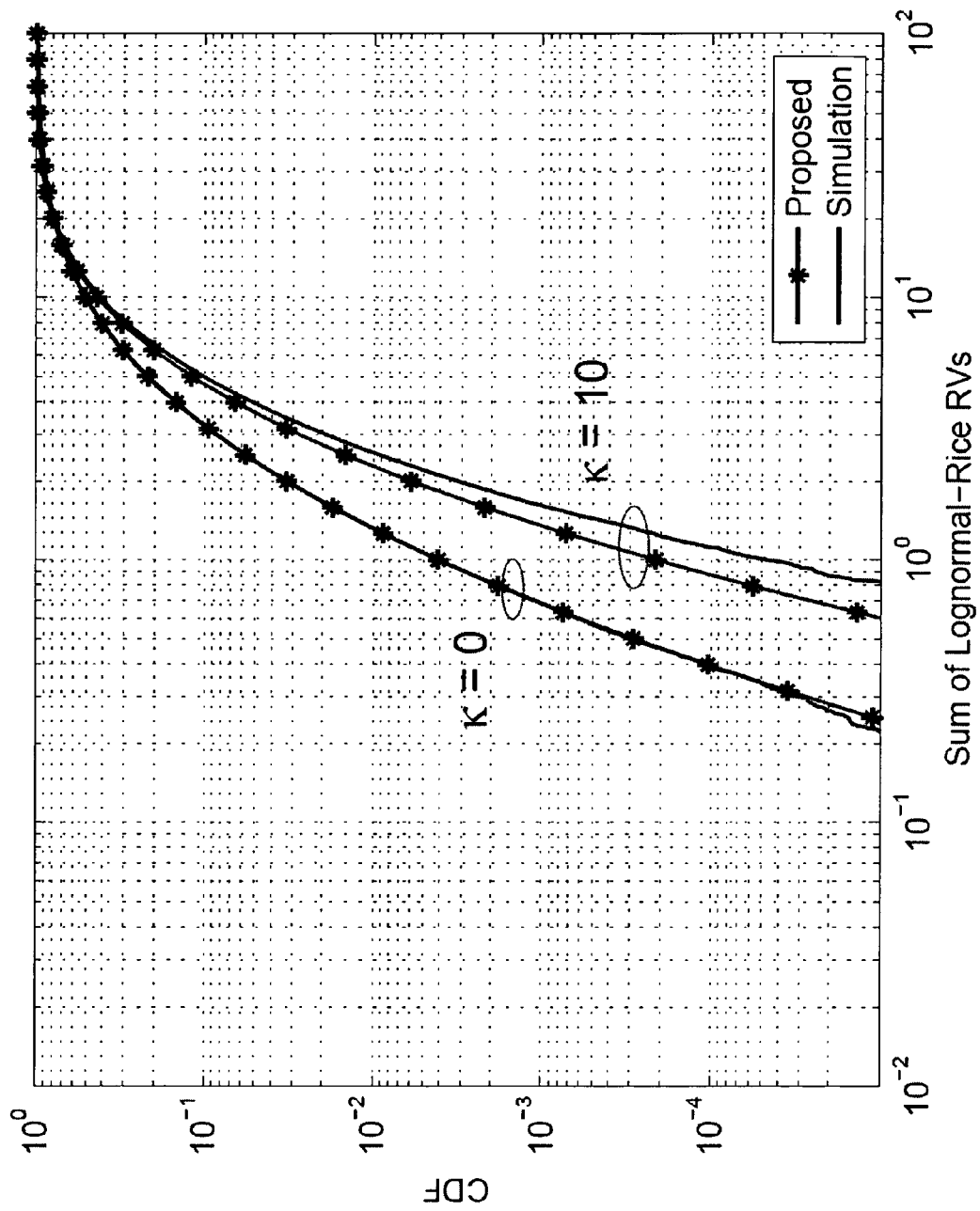
FIGS. 12 and 13 are graphs of the effect of the Rice-coefficient on the accuracy of approximating CDF and CCDF.
Figure 13:
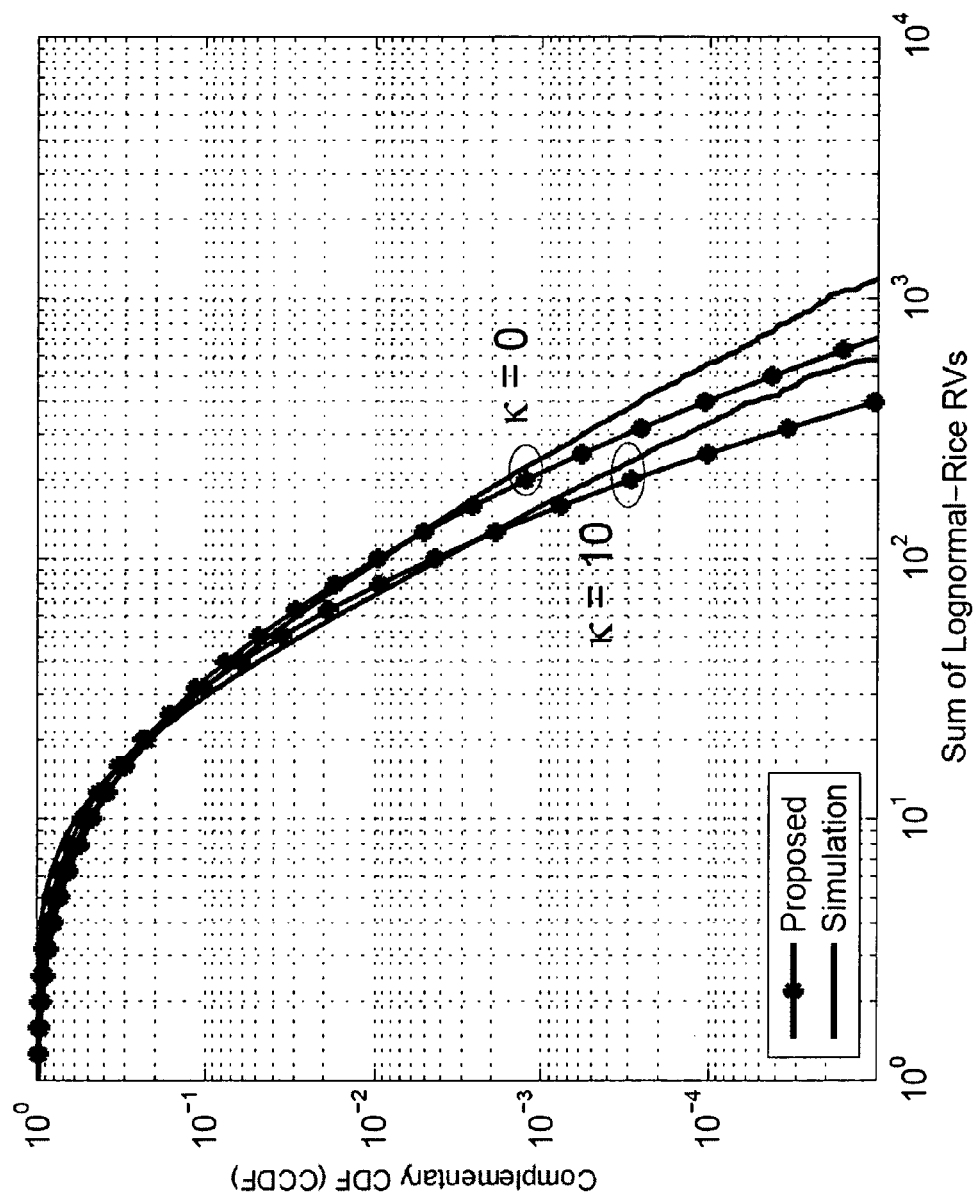

The effect of the Rician-coefficient, K, is shown in FIGS. 12 and 13, which plots the CDF and the CCDF of the sum of six lognormal-Rician RVs with a lognormal standard deviation of 6 dB. We can see that the CDF or CCDF can be accurately approximated. The accuracy of the approximation improves as $\kappa$ decreases.

Figure 14:
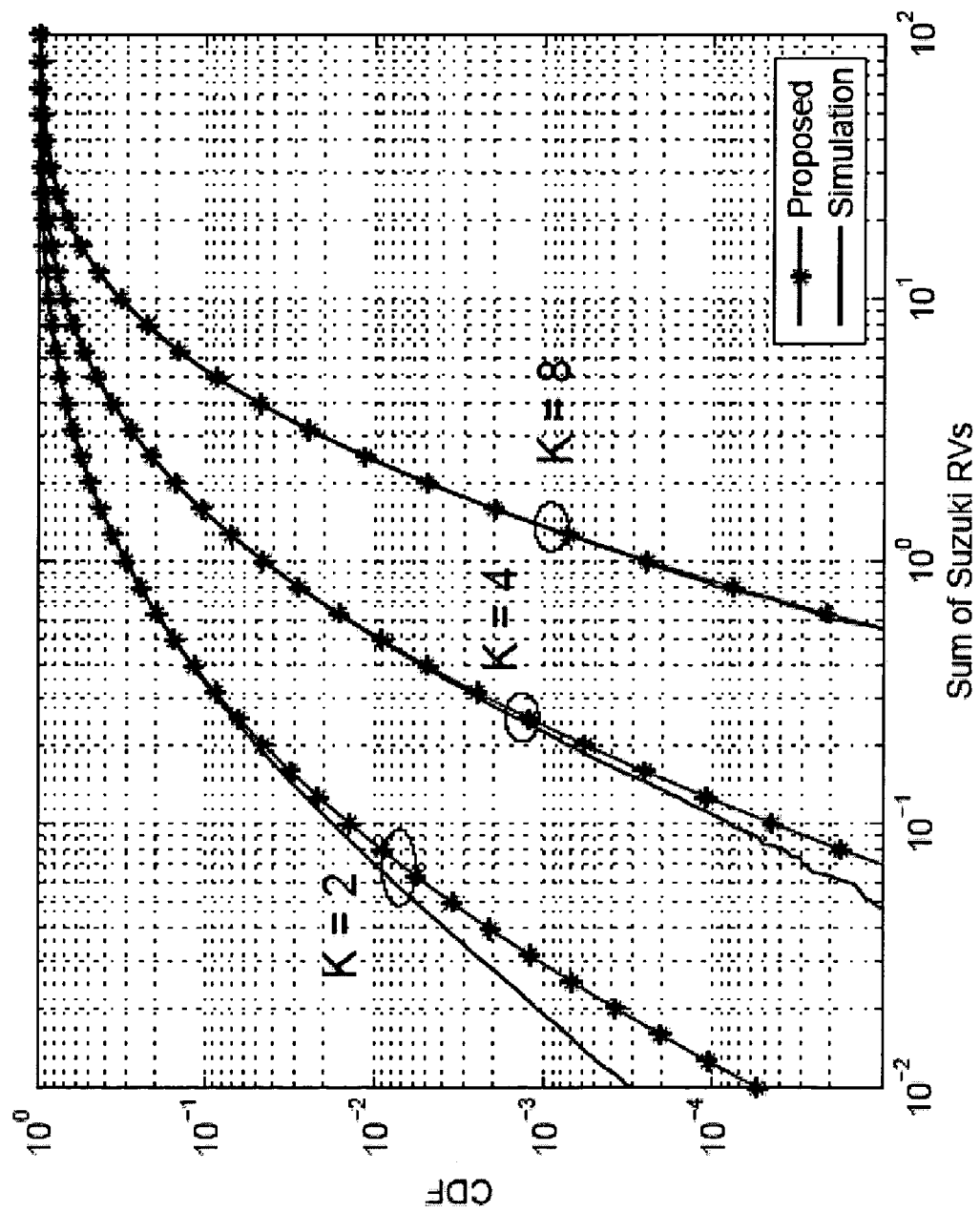
FIG. 14 is a graph of the effect of the number of Suzuki RVs on the accuracy of approximating the CDF.

FIG. 14 plots the CDF of a sum of different numbers of independent Suzuki RVs using parameters obtained from Equation (21) and compares them with Monte Carlo simulation results. It can be seen that the MGF method accurately approximates the sum of Suzuki RVs by a single lognormal RV. The results hold for K=2, 4, and 8.

Lognormal Approximation in a Region of Interest

While designing a system, it is desired to provide an analytical description of the behavior of a sum of RVs and emphasize its accuracy in a region of interest. For example, the region of interest can be defined as a range of dB values. For example, Beaulieu and Xie use the minimax criterion, which minimizes the maximum error in an interval of interest, to fit the parameters, while Schleher's method advocates three different parameter sets for three regions.

The MGF method with its two free parameters, the points $s_1$ and $s_2$, provides the parametric flexibility to accurately model the behavior in a region of interest, for various scenarios.

The paradigm for doing so is developed using two metrics that measure the relative deviation of the CDF or the CCDF curves in a region of interest. It is shown that accuracy better than F-W and S-Y methods is achievable—even in matching the tail portion of the CCDFs in which the F-W method is known to work well and even in the head portion of the CDF in which the S-Y method is known to work well.

Let $F_{(s_1,s_2)}^c$ denote the CCDF and $F_{(s_1,s_2)}$ denote the CDF of the lognormal distribution that approximates the RV. Let H and $H^c$ denote the empirically observed CDF and CCDF of the RV. These are obtained by Monte Carlo simulations. Let $x_1, \ldots, x_n$ denote n reference points in the region of interest. The accuracy metrics for CDF and CCDF are defined by:

$$M_{cdf} = \sum_{i=1}^{R} e_i \frac{|H(x_i) - F_{(s_1,s_2)}(x_i)|}{H(x_i)}, \quad (23)$$

$$M_{ccdf} = \sum_{i=1}^{R} e_i^c \frac{|H^c(x_i) - F_{(s_1,s_2)}^c(x_i)|}{H^c(x_i)}, \quad (24)$$

where $e_i$ and $e_i^c$ are the relative error weights for CDF and CCDF, respectively, to emphasize different accuracies in tracking different reference points. The weights are normalized such that $\Sigma_{i=1}^R e_i=1$ and $\Sigma_{i=1}^R e_i^c=1$.

Figure 15:
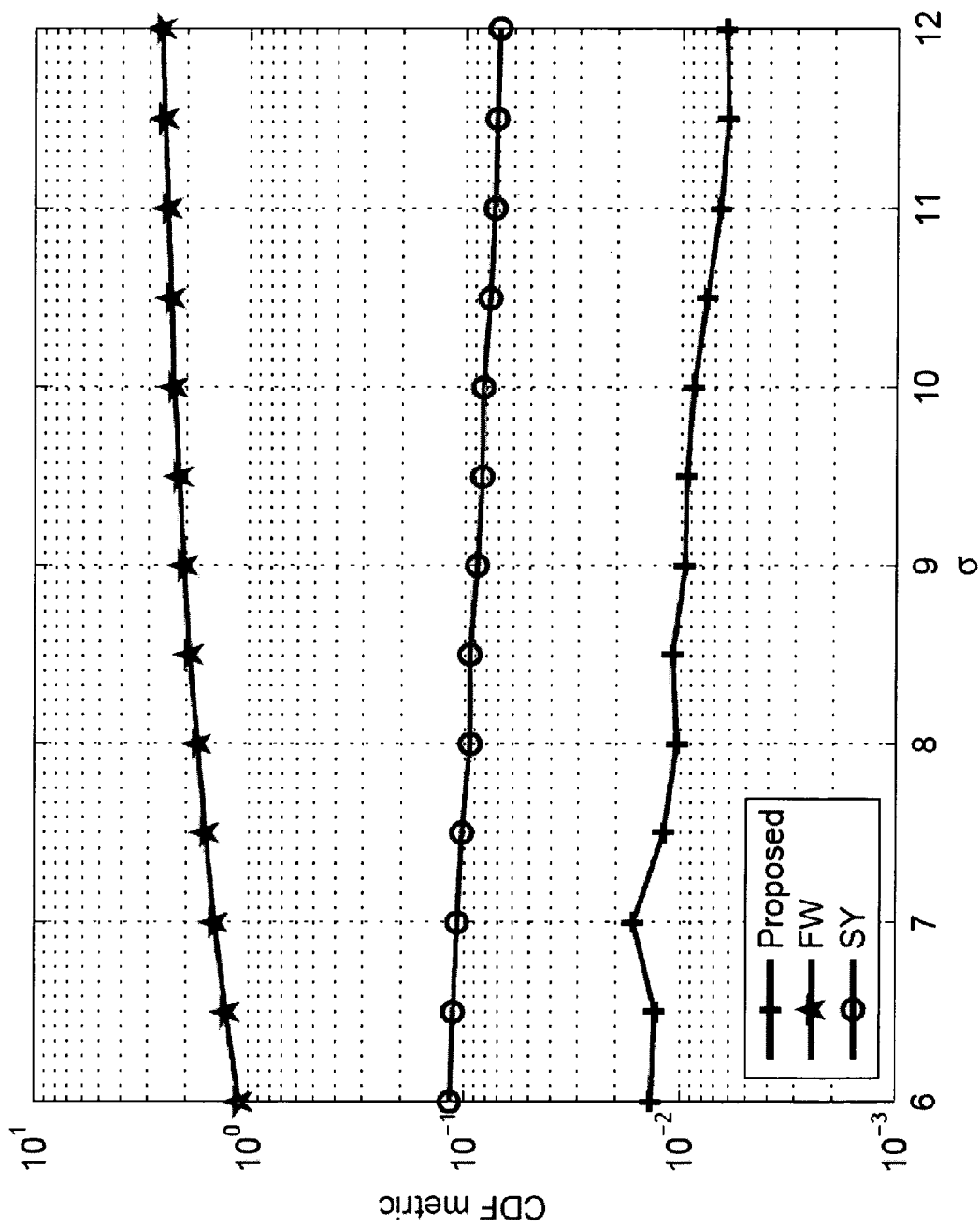
FIGS. 15 and 16 are graphs comparing the achievable accuracy in region of interest.
Figure 16:
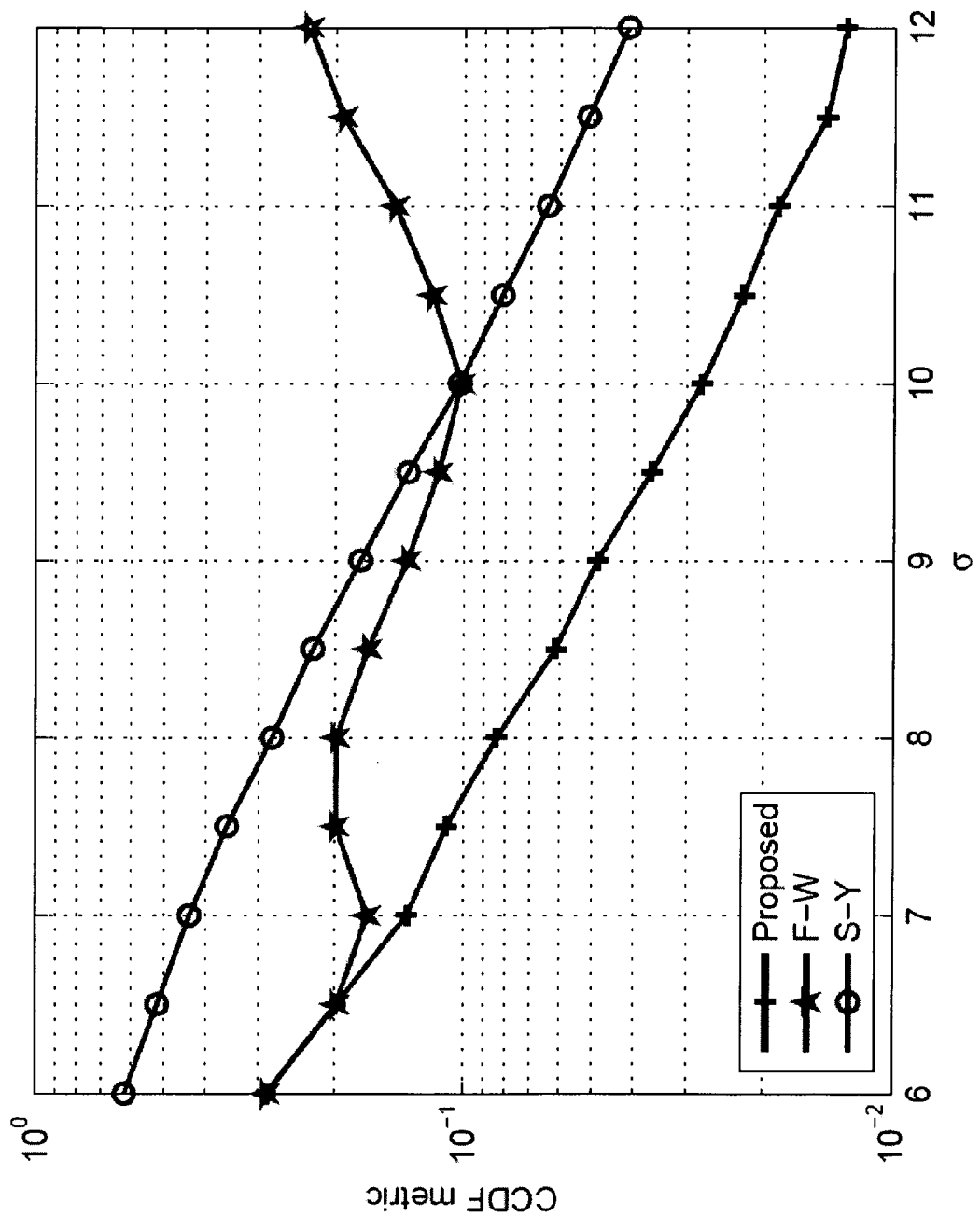

The effect of varying $\sigma$ on the accuracy possible in approximating the CDF and CCDF is shown in FIGS. 15 and 16. The error weights are set as $e_i=e_i^c=1/R$, for all i. In FIG. 15, the $M_{cdf}$, defined over a range of 0 to 10 dB in steps of 3 dB is plotted for F-W, S-Y, and the MGF method. An unconstrained Nelder-Mead non-linear maximization is used to minimize the cost by optimizing the points $s_1$ and $s_2$. These in turn determine $\mu$ and $\sigma$. As expected, the S-Y method is more accurate than the F-W method, while the MGF method is the most accurate among all the methods. As $\sigma$ increases, the accuracy of the MGF method and the S-Y method improves while that of the F-W method degrades. FIG. 16 plots Mccdf, defined over the range of 15 dB to 25 dB in steps of 3 dB, for the three methods.

For any given $\sigma$, the MGF method is the most accurate. It can be seen that the accuracy of the MGF method and the S-Y method improves as $\sigma$ increases. While the F-W method is as accurate as the MGF method for $\sigma \leq 6.5$ dB, it becomes the least accurate of all the methods for $\sigma>10$ dB.

FIGS. 15 and 16 show the accuracy achievable by the MGF method when $s_1$ and $s_2$ are selected optimally.

Figure 17:
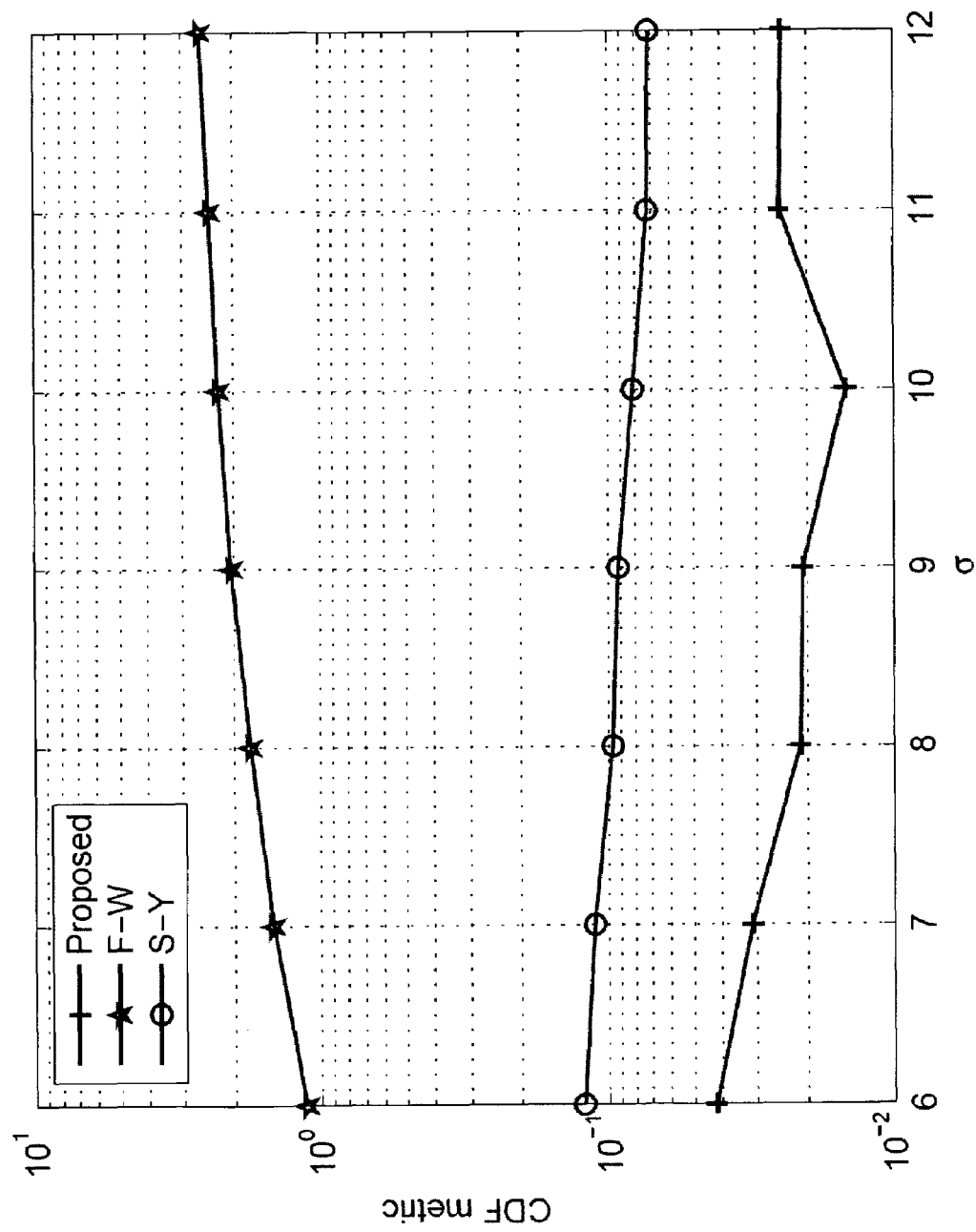
FIGS. 17 and 18 are graphs comparing the accuracy of MGF method with the same s1 and s2 values in a region of interest.
Figure 18:
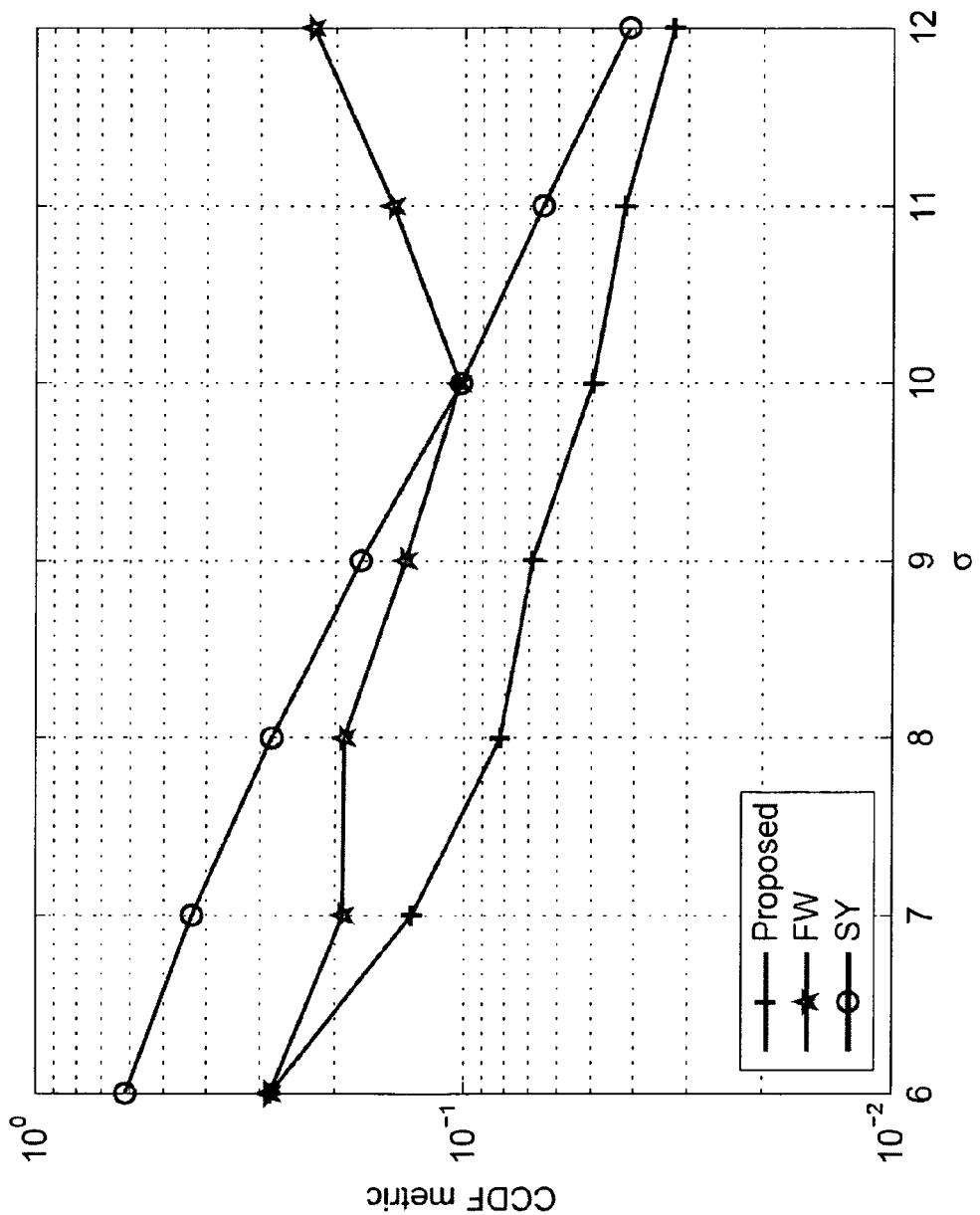

We now describe the accuracy of the MGF method when the same pre-specified set of points $s_1=1$ and $s_2=0.2$ is used. FIG. 17 plots $M_{cdf}$ for the MGF method and the S-Y and F-W methods and shows that the MGF method is the most accurate of all. FIG. 18 compares the accuracy for the CCDF for points $s_1=0.001$ and $s_2=0.005$. Note that the above values of $s_1$ and $s_2$ have been used in several previous figures. The region of interest and the reference points are the same for FIGS. 15 and 16.

Effect of the Invention

Provided is a method for approximating the sum of several random variables with a distribution of a single lognormal random variable (RV). More specifically, the random variables represent interfering signals at a receiver. The method is motivated by an interpretation of a moment generating function (MGF) as a weighted integral of a probability distribution function, and a realization that the MGF provides the parametric flexibility needed to approximate, as accurately as required, different portions of the PDF.

The method is general enough to cover the cases of independent, but not necessarily identical, lognormal RVs, arbitrarily correlated lognormal RVs, and independent lognormal-Rician and Suzuki RVs.

Although the invention has been described by the way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for analyzing a set of signals, each signal acquired from a physical system, comprising the steps of:
   measuring a set of parameters characterizing a set of signals;
   evaluating a first point and a second point of a moment generating function for a combination of the set of signals according to the set of parameters to obtain a first sample and a second sample, respectively;
   defining a first equation, the first equation having an approximation of a moment generation function of a lognormal random variable representing the combination of the set of signals at the first point on the left side of the first equation and the first sample on the right side of the first equation;
   defining a second equation, the second equation having the approximation of the moment generation function of the lognoimal random variable representing the combination of the set of signals at the second point on the left side of the second equation and the second sample on the right side of the equation;
   solving the first and second equations to obtain a mean and a variance of the lognormal random variable; and
   using the mean and the vatiance to calculate a distribution of the lognormal random variable where the distribution represents the combination of the set of the signals.

2. The method of claim 1, in which the signals are correlated, and the parameters are measured jointly for the set of signals.

3. The method of claim 2, in which the set of parameters includes a mean and a variance of the power of a combination of the set of signals.

4. The method of claim 1, in which the signals are independent, and the parameters are measured individually for each signal.

5. The method of claim 4, in which the set of parameters includes a mean and variance of the power of each signal.

6. The method of claim 4, in which the signals are independent the first and second equations are $$\hat{\Psi}_Y(s; \mu_Y, \sigma_Y) = \hat{\Psi}^{(c)}_{(\Sigma_{k=1}^K Y_k)}(s; \mu, C), \text{ at } i = 1,$$

and $$\hat{\Psi}_Y(s; \mu_Y, \sigma_Y) = \hat{\Psi}^{(c)}_{(\Sigma_{k=1}^K Y_k)}(s; \mu, C), \text{ at } i = 2,$$

where $$\hat{\Psi}^{(c)}_{(\Sigma_{k=1}^K Y_k)}(s; \mu, C) = \sum_{n_1=1}^{N} \cdots \sum_{n_K=1}^{N} \left[ \prod_{k=1}^{K} \frac{w_{n_k}}{\sqrt{\pi}} \exp\left(-s \exp\left(\frac{\mu_k}{\xi}\right)\right) \right]$$

$$\exp\left(-s \sum_{k=1}^{K} \left[ \exp\left(\frac{\sqrt{2}}{\xi} \sum_{j=1}^{K} c'_{kj} a_{n_j}\right) \right]\right)$$

-continued and $$\hat{\Psi}_Y(s; \mu_Y, \sigma_Y) = \sum_{n=1}^{N} \frac{w_n}{\sqrt{\pi}} \exp\left[-s \exp\left(\frac{\sqrt{2} \sigma_X a_n + \mu_X}{\xi}\right)\right]$$

where $\mu_{X_i}$ and $\sigma_{X_i}$ are the mean and variance of the lognormal variable X, $w_n$ are predetermined weights, $a_n$ are abscissas, and a particular moment generation function $\Psi$ is evaluated at points $s_1$ and $s_2$, and $$\xi = \frac{\log_{10} e}{10},$$

and N is a Hermite integration order, and C is a correlation matrix.

7. The method of claim 1, in which the signals are correlated, and a single in moment generating function is evaluated jointly for a combination of all of the signals to obtain the first sample and the second sample.

8. The method of claim 1, in which the signals are independent, and the moment generating function is evaluated individually for each signal to obtain a set of first samples corresponding to the first point and a set of second samples corresponding to die second point, and further comprising:
   combining the set of first samples into the first sample; and
   combining the set of second samples into the second sample.

9. The method of claim 8, in which the combining is a multiplication of the samples.

10. The method of claim 1, in which die signals are radio signals.

11. The method of claim 4, in which the radio signals are transmitted in a mobile telephone network.

12. The method of claim 4, in which the radio signals are co-channel interfering signals.

13. The method of claim 10, in which the radio signals have a lognormal distribution over large distances.

14. The method of claim 10, in which the radio signals are time-delayed versions of a transmitted signal.

15. The method of claim 1, in which the set of parameters includes a Rician factor.

16. The method of claim 1, in which the moment generating function of a random variable Y representing a particular signal at a particular point s is $\Psi_Y(s) = E_Y[e^{-sY}] = \int e^{-sy} p_Y(y) dy$, where s is the point at which the moment generating function is evaluated, $E_Y[.]$ is an expectation with respect to the random variable Y, and a probability distribution function $p_y$ is expressed as $$p_Y(y) = \frac{1}{\sigma y \sqrt{2\pi}} \exp\left(-\frac{(\xi \log_{10} y - \mu)^2}{2\sigma^2}\right),$$

where $\mu$ is the mean, $\sigma$ is the standard deviation, $\sigma^2$ is the variance, and $$\xi = \frac{\log_{10} e}{10}.$$

17. The method of claim 1, in which values of the points are relatively high to match on a head of the distribution, and relatively low to match on a tail of the distribution.

18. The method of claim 1, in which a particular approximation of the moment generating function is a series expansion based on a Gauss-Hermite integration.

19. The method of claim 1, in which the signals are correlated the first and second equations are $$\sum_{n=1}^{N} \frac{w_n}{\sqrt{\pi}} \exp\left[-s_1 \exp\left(\frac{\sqrt{2}\,\sigma_X a_n + \mu_X}{\xi}\right)\right] = \prod_{i=1}^{K} \hat{\Psi}_Y(s_1; \mu_{X_i}, \sigma_{X_i}),$$

and $$\sum_{n=1}^{N} \frac{w_n}{\sqrt{\pi}} \exp\left[-s_2 \exp\left(\frac{\sqrt{2}\,\sigma_X a_n + \mu_X}{\xi}\right)\right] = \prod_{i=1}^{K} \hat{\Psi}_Y(s_2; \mu_{X_i}, \sigma_{X_i}),$$

where $$\hat{\Psi}_Y(s; \mu_X, \sigma_X) = \sum_{n=1}^{N} \frac{w_n}{\sqrt{\pi}} \exp\left[-s\exp\left(\frac{\sqrt{2}\,\sigma_X a_n + \mu_X}{\xi}\right)\right],$$

and where $\mu_{X_i}$ and $\sigma_{X_i}$ are the mean and variance of the lognormal variable X, $w_n$ are predetermined weights, $a_n$ are abscissas, and a particular moment generation function $\Psi$ is evaluated at points $s_1$ and $s_2$, and $$\xi = \frac{\log_{10} e}{10},$$

and N is a Hermite integration order.

20. The method of claim 1, in which more than two points are evaluated.

21. The method of claim 1, in which a linear combination of the signals is approximated by the lognormal random variable, and the linear combination of the signals has a form $\Sigma a_i Y_i$, where $a_i$ are arbitrary weights.

22. The method of claim 1, in which the moment generation function of the lognormal random variable representing the combination of the set of signals is evaluated at more than two points to generate a corresponding number of samples and equations, which are solved to obtain the mean and the variance.

23. The method of claim 1, in which the combination is a sum of the set of signals.

24. The method of claim 1, in which the combination is linear.

25. The method of claim 1, in which a particular approximation of the moment generating function is a series expansion based on a Newton-Cotes formulation.

26. The method of claim 1, in which a particular approximation of the moment generating function is a series expansion based on a Gaussian quadrature formulation.

* * * * *